US012033550B2

(12) United States Patent
Jee et al.

(10) Patent No.: US 12,033,550 B2
(45) Date of Patent: Jul. 9, 2024

(54) METHOD OF TESTING DISPLAY DEVICE

(71) Applicant: Samsung Display Co., Ltd., Yongin-si (KR)

(72) Inventors: Ahnho Jee, Hwaseong-si (KR); Heebum Park, Seongnam-si (KR); Sang-Woo Park, Cheonan-si (KR); Keunhyuk Youn, Hwaseong-si (KR); Sungho Cho, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/082,187

(22) Filed: Dec. 15, 2022

(65) Prior Publication Data

US 2023/0316965 A1 Oct. 5, 2023

(30) Foreign Application Priority Data

Mar. 28, 2022 (KR) ........................ 10-2022-0037942

(51) Int. Cl.
*G09G 3/00* (2006.01)

(52) U.S. Cl.
CPC ..... *G09G 3/006* (2013.01); *G09G 2310/0267* (2013.01); *G09G 2330/12* (2013.01)

(58) Field of Classification Search
CPC ........... G09G 3/006; G09G 2310/0267; G09G 2330/12; G09G 3/3208; G01R 19/0092; G01R 31/2825
See application file for complete search history.

(56) References Cited

U.S. PATENT DOCUMENTS

| | | | | |
|---|---|---|---|---|
| 7,132,842 | B2 * | 11/2006 | Miyagawa | G09G 3/20 365/201 |
| 10,269,275 | B2 * | 4/2019 | Tsujita | H10K 50/00 |
| 11,645,957 | B1 * | 5/2023 | Wetherell | G09G 3/3283 345/214 |
| 2001/0048318 | A1 * | 12/2001 | Matsueda | G09G 3/3688 324/750.3 |
| 2003/0030464 | A1 * | 2/2003 | Tomita | G09G 3/006 324/760.02 |
| 2008/0074358 | A1 * | 3/2008 | Ogawa | G09G 3/3233 345/76 |
| 2008/0094385 | A1 * | 4/2008 | Tazuke | G09G 3/006 345/211 |

(Continued)

FOREIGN PATENT DOCUMENTS

| | | |
|---|---|---|
| JP | 5111564 B2 | 1/2013 |
| JP | 6167374 B2 | 7/2017 |

(Continued)

*Primary Examiner* — Jose R Soto Lopez
(74) *Attorney, Agent, or Firm* — CANTOR COLBURN LLP

(57) ABSTRACT

A method of testing a display device including a display panel which displays an image and a driver which drives the display panel including measuring a driving operating current in a state where the driver is enabled and the display panel is disabled, and determining whether the driver is defective, based on the driving operating current and measuring a display operating current in a state where the driver and the display panel are enabled, and determining whether the display panel is defective, based on the display operating current.

20 Claims, 18 Drawing Sheets

(56) References Cited

U.S. PATENT DOCUMENTS

| | | | | |
|---|---|---|---|---|
| 2008/0238834 | A1* | 10/2008 | Matsuo | G09G 3/3233 345/76 |
| 2008/0238905 | A1* | 10/2008 | Matsui | G09G 3/006 345/205 |
| 2008/0303754 | A1* | 12/2008 | Murata | G09G 3/3275 345/76 |
| 2009/0015572 | A1* | 1/2009 | Matsui | G09G 3/3688 345/204 |
| 2009/0109142 | A1* | 4/2009 | Takahara | G09G 3/006 345/76 |
| 2011/0130981 | A1* | 6/2011 | Chaji | G01R 31/44 702/58 |
| 2012/0127221 | A1* | 5/2012 | Tamaki | G09G 3/3233 345/691 |
| 2013/0265072 | A1* | 10/2013 | Kim | G09G 3/006 361/679.01 |
| 2014/0354286 | A1* | 12/2014 | Kim | G09G 3/006 324/414 |
| 2015/0015820 | A1* | 1/2015 | Masutani | G02F 1/1345 257/48 |
| 2015/0049072 | A1* | 2/2015 | Eggert | G09G 3/006 345/211 |
| 2015/0379967 | A1* | 12/2015 | Kim | G09G 5/18 345/82 |
| 2016/0217719 | A1* | 7/2016 | Kabatek | G09G 3/006 |
| 2016/0247436 | A1* | 8/2016 | Lee | G09G 3/2003 |
| 2017/0005298 | A1* | 1/2017 | Ishizu | H10K 59/12 |
| 2017/0032722 | A1* | 2/2017 | Wang | G09G 3/3266 |
| 2017/0038427 | A1* | 2/2017 | Kim | G09G 3/00 |
| 2017/0213490 | A1* | 7/2017 | Jeong | G09G 3/006 |
| 2017/0269398 | A1* | 9/2017 | Park | H01L 27/1244 |
| 2018/0026117 | A1* | 1/2018 | Xiong | H10K 59/123 345/92 |
| 2018/0090059 | A1* | 3/2018 | Baroughi | G09G 3/006 |
| 2018/0226042 | A1* | 8/2018 | Fletcher | G09G 3/3677 |
| 2019/0278114 | A1* | 9/2019 | Lee | G02F 1/13452 |
| 2019/0325796 | A1* | 10/2019 | Chen | G09G 3/3233 |
| 2019/0347985 | A1* | 11/2019 | Shaeffer | G09G 3/2003 |
| 2020/0211482 | A1* | 7/2020 | Pyun | H05B 45/14 |
| 2020/0302840 | A1* | 9/2020 | Kim | G09G 3/006 |
| 2020/0341050 | A1* | 10/2020 | Hsiao | G01R 31/2635 |
| 2021/0202683 | A1* | 7/2021 | Lee | G09G 3/006 |
| 2021/0242284 | A1* | 8/2021 | Kim | G06F 3/0445 |
| 2021/0248938 | A1* | 8/2021 | Lee | G09G 3/006 |
| 2022/0076599 | A1* | 3/2022 | Akyol | G09G 3/3233 |
| 2022/0165221 | A1* | 5/2022 | Lim | G01R 31/2635 |
| 2022/0343817 | A1* | 10/2022 | An | H10K 59/131 |
| 2022/0344325 | A1* | 10/2022 | Qu | H01L 27/124 |

FOREIGN PATENT DOCUMENTS

| | | | |
|---|---|---|---|
| KR | 100651918 | B1 | 12/2006 |
| KR | 102028978 | B1 | 10/2019 |
| KR | 102250982 | B1 | 5/2021 |
| KR | 102259356 | B1 | 6/2021 |

* cited by examiner

METHOD OF TESTING DISPLAY DEVICE

This application claims priority to Korean Patent Application No. 10-2022-0037942, filed on Mar. 28, 2022, and all the benefits accruing therefrom under U.S.C. § 119, the content of which in its entirety is herein incorporated by reference.

BACKGROUND

1. Field

Embodiments of the disclosure described herein relate to a method of testing a display device, and more particularly, relate to a method for determining whether a display device is defective.

2. Description of the Related Art

A multimedia electronic device such as a TV, a mobile phone, a tablet personal computer (PC), a navigation system, a game console, and the like includes a display device that displays an image.

In a process of manufacturing a display device, a defective display device may be detected in advance through a test for determining whether the display device is defective. In a test for determining whether the display device is defective, whether the display device is defective may be determined by displaying a test image on a display device and analyzing the displayed test image.

SUMMARY

Embodiments of the disclosure provide a test method for determining whether a display device is defective (or detecting a defect in the display device), by determining whether configurations included in the display device are defective.

According to an embodiment, a method of testing a display device including a display panel which displays an image and a driver which drives the display panel includes measuring a driving operating current in a state where the driver is enabled and the display panel is disabled, and determining whether the driver is defective, based on the driving operating current. In such an embodiment, the method of testing the display device further includes measuring a display operating current in a state where the driver and the display panel are enabled, and determining whether the display panel is defective, based on the display operating current.

According to an embodiment of the disclosure, the determining whether the display panel is defective may be performed when the driver is determined to be normal.

According to an embodiment of the disclosure, the driver may include a driver chip which receives an image signal and converts the image signal into a data signal corresponding to the display panel, and a scan block which generates a scan signal for displaying the image. In such an embodiment, the determining whether the driver is defective may include determining whether the driver chip is defective, and determining whether the scan block is defective.

According to an embodiment of the disclosure, the driver chip may include a logic part which receives the image signal and changes the image signal into an image data signal corresponding to the display panel, and an analog part which changes the image data signal into the data signal for driving the display panel. In such an embodiment, the determining whether the driver chip is defective may include measuring a first sub driving current in a state where the logic part is enabled and the analog part is disabled, and determining whether the logic part is defective, based on the first sub driving current.

According to an embodiment of the disclosure, the determining whether the driver chip is defective may further include measuring a second sub driving current in a state where the logic part and the analog part are enabled, and determining whether the analog part is defective, based on the second sub driving current.

According to an embodiment of the disclosure, the determining whether the analog part is defective may be performed after the determining whether the logic part is defective.

According to an embodiment of the disclosure, the display panel may include a plurality of pixels which displays the image, and a plurality of data lines and a plurality of scan lines which are electrically connected to the pixels. In such an embodiment, the scan block may provide the scan signal to the display panel through the scan lines. In such an embodiment, the determining whether the scan block is defective may include measuring a third sub driving current in a state where the scan block is enabled and the display panel is disabled, and determining whether the scan block is defective, based on the third sub driving current.

According to an embodiment of the disclosure, the determining whether the scan block is defective may be performed after the determining whether the analog part is defective.

According to an embodiment of the disclosure, the driver chip may further include a data output part which provides the data signal to the display panel. In such an embodiment, the determining whether the data output part is defective may include measuring a fourth sub driving current in a state where the data output part is enabled and the display panel is disabled, and determining whether the data output part is defective, based on the fourth sub driving current.

According to an embodiment of the disclosure, the determining whether the data output part is defective may be performed after the determining whether the scan block is defective.

According to an embodiment of the disclosure, the display panel may include a plurality of pixels which displays the image, a plurality of write scan lines, a plurality of emission scan lines, and a plurality of driving voltage lines which are electrically connected to the pixels. In such an embodiment, the driver may include a gate driving block which provides a write scan signal to the pixels through the write scan lines, and an emission driving block which provides an emission scan signal to the pixels through the emission scan lines. In such an embodiment, the determining whether the display panel is defective may include measuring a first sub display current in a state where the emission scan signal is provided to the pixels and the write scan signal is not provided to the pixels, and determining a connection state between the pixels and the emission scan lines based on the first sub display current.

According to an embodiment of the disclosure, the determining whether the display panel is defective may be performed after the determining whether the driver is defective.

According to an embodiment of the disclosure, the determining whether the display panel is defective may include measuring a second sub display current in a state where the write scan signal is provided to the pixels and a driving voltage for driving the pixels is not provided to the pixels, and determining a connection state between the pixels and the write scan lines based on the second sub display current.

According to an embodiment of the disclosure, the determining the connection state between the pixels and the write scan lines may be performed after the determining the connection state between the pixels and the emission scan lines.

According to an embodiment of the disclosure, the determining whether the display panel is defective may further include measuring a third sub display current in a state where the driving voltage is provided to the pixels and the display panel does not display the image, and determining a connection state between the pixels and the driving voltage lines based on the third sub display current.

According to an embodiment of the disclosure, the determining the connection state between the pixels and the driving voltage lines may be performed after the determining the connection state between the pixels and the write scan lines.

According to an embodiment of the disclosure, the determining whether the display panel is defective may further include measuring a fourth sub display current in a state where the image is displayed on the display panel, and determining whether the image is detective, based on the fourth sub display current.

According to an embodiment of the disclosure, the determining whether the image is defective may be performed after the determining the connection state between the pixels and the driving voltage lines.

According to an embodiment of the disclosure, the display device may further include an input sensing layer disposed on the display panel, where the input sensing layer detects an external input. In such an embodiment, the method of testing the display device may further include measuring an input operating current in a state where the driver, the display panel and the input sensing layer are enabled, and determining whether the input sensing layer is defective, based on the input operating current.

According to an embodiment of the disclosure, the determining whether the input sensing layer is defective may be performed when the display panel is determined to be normal.

BRIEF DESCRIPTION OF THE DRAWINGS

The above and other features of the disclosure will become apparent by describing in detail embodiments thereof with reference to the accompanying drawings.

DETAILED DESCRIPTION

Figure 1:
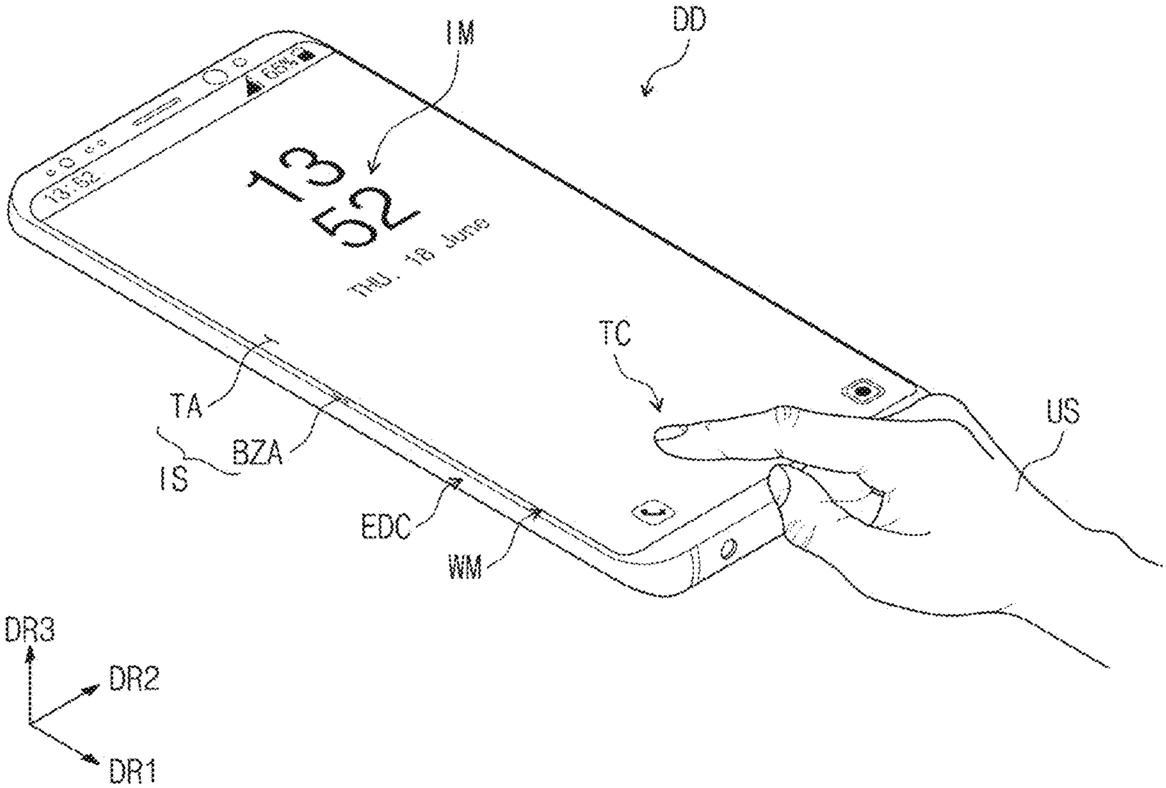
FIG. 1 is a perspective view of a display device, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents.

Although the terms "first", "second", etc. may be used to describe various components, the components should not be construed as being limited by the terms. The terms are only used to distinguish one component from another component. For example, without departing from the scope and spirit of the disclosure, a first component may be referred to as a second component, and similarly, the second component may be referred to as the first component.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described with reference to the accompanying drawings.

Figure 2:
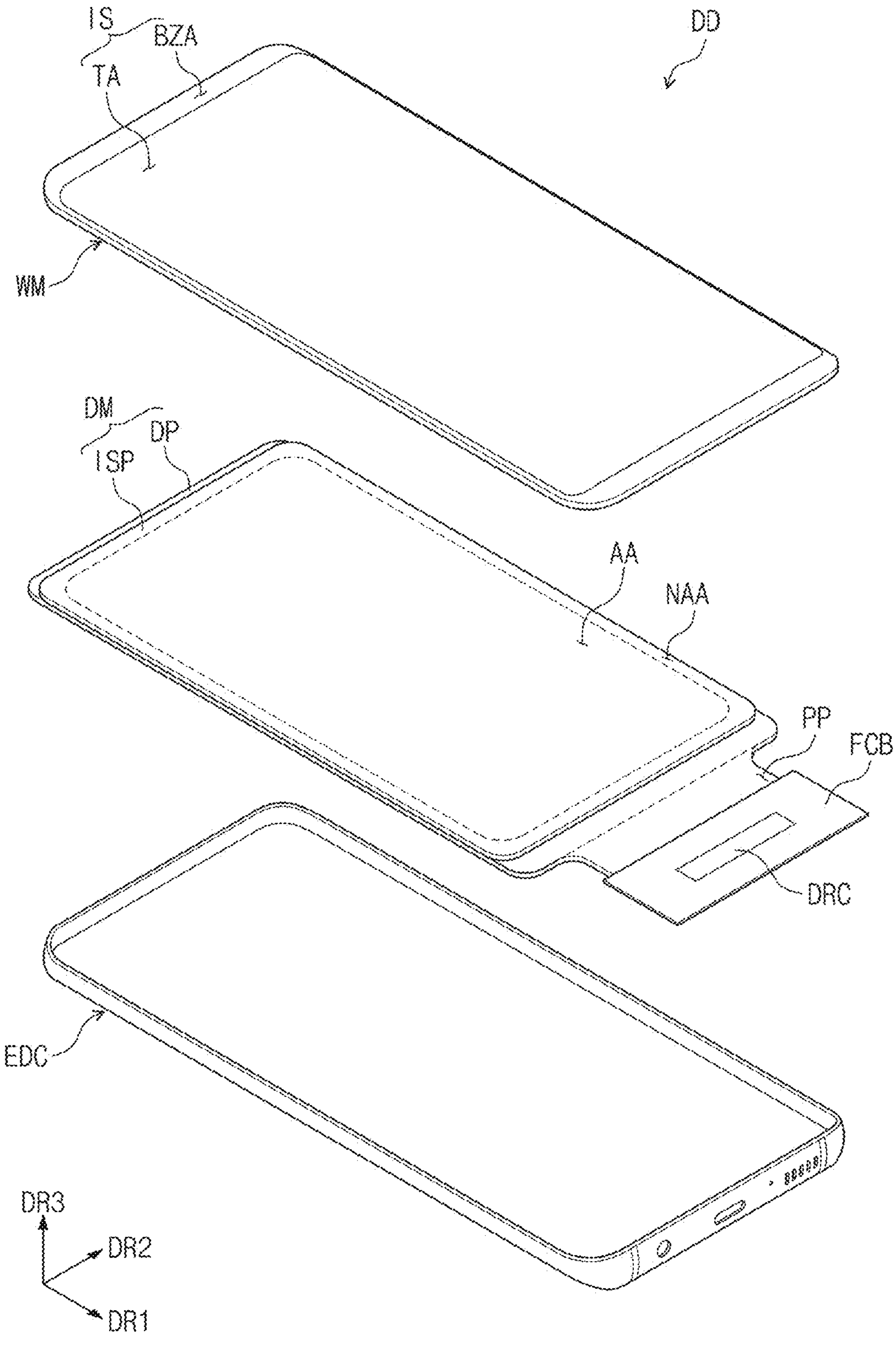
FIG. 2 is an exploded perspective view of a display device, according to an embodiment of the disclosure.

FIG. 1 is a perspective view of a display device, according to an embodiment of the disclosure. FIG. 2 is an exploded perspective view of a display device, according to an embodiment of the disclosure.

Referring to FIG. 1, an embodiment of the display device DD may be a device activated depending on an electrical signal. FIGS. 1 and 2 illustrate an embodiment where the display device DD is a smartphone. However, the disclosure is not limited thereto. In an alternative embodiment, for example, the display device DD may be a small and medium-sized display device, such as a tablet PC, a notebook computer, a vehicle navigation system, a game console, or the like, as well as a large-sized display device, such as a television, a monitor, or the like. The above examples are provided only as an embodiment, and it would be understood that the display device DD may be implemented as another type of a display device without departing from the concept of the disclosure.

The display device DD has a long side in a first direction DR1 and a short side in a second direction DR2 intersecting the first direction DR1. In an embodiment, the display device DD may have a quadrangle whose corners are rounded. However, the shape of the display device DD is not limited thereto. In an embodiment, for example, the display device DD having various shapes (e.g., a circular shape) may be provided. The display device DD may display an image IM on a display surface IS, which is parallel to each of the first direction DR1 and the second direction DR2, in a third direction DR3. The display surface IS on which the image IM is displayed may correspond to a front surface of the display device DD.

In an embodiment, a front surface (or an upper/top surface) and a rear surface (or a lower/bottom surface) of each member are defined based on a direction in which the image IM is displayed. The front surface may be opposite to the rear surface in the third direction DR3, and a normal direction of each of the front surface and the rear surface may be parallel to the third direction DR3.

A separation distance between the front surface and the rear surface in the third direction DR3 may correspond to a thickness of the display device DD or in the third direction DR3. Here, directions that the first, second, and third directions DR1, DR2, and DR3 indicate may be relative in concept and may be changed to different directions.

The display device DD may sense an external input TC applied from the outside. The external input TC may include various types of inputs that are provided from the outside of the display device DD. The external input TC may one of various types of external inputs, such as a part of a body of the user US, light, heat, and pressure, or a combination thereof. In an embodiment, it is described that the external input TC of the user US is a touch input applied to a front surface by a hand of the user US. However, this is an example. As described above, the external input TC of the user US may be provided in various forms. Also, the display device DD may detect the external input TC of the user US applied to a side surface or a rear surface of the display device DD depending on a structure and is not limited to one embodiment. The display device DD may detect a location (e.g., coordinate information, etc.) of the external input TC.

The external input TC according to an embodiment of the disclosure may include inputs by an input device (e.g., a stylus pen, an active pen, a touch pen, an electronic pen, an e-pen, or the like) in addition to a hand of a user US.

The display surface IS of the display device DD may be divided into a transparent area TA and a bezel area BZA. The transparent area TA may be an area in which the image IM is displayed. A user visually perceives the image IM through the transparent area TA. In an embodiment, the transparent area TA is illustrated in the shape of a quadrangle whose corners are rounded. However, this is illustrated as an example. The transparent area TA may have various shapes, not limited to one embodiment.

The bezel area BZA is adjacent to the transparent area TA. The bezel area BZA may have a predetermined color. The bezel area BZA may surround the transparent area TA. Accordingly, the shape of the transparent area TA may be substantially defined by the bezel area BZA. However, this is illustrated as an example. In an alternative embodiment, for example, the bezel area BZA may be disposed adjacent to only one side of the transparent area TA or may be omitted. The display device DD according to an embodiment of the disclosure may be variously modified and is not limited to one embodiment.

As illustrated in FIG. 2, an embodiment of the display device DD may include a window WM, a display module DM, and an external case EDC. The display module DM may include a display panel DP that displays the image IM depending on an electrical signal and an input sensing layer ISP that transmits/receives information about the external input TC (see FIG. 1).

The window WM protects an upper surface of the display module DM. The window WM may be optically transparent. The window WM may include or be formed of a transparent material capable of outputting the image IM. In an embodiment, for example, the window WM may be formed of glass, sapphire, plastic, etc. In an embodiment, the window WM may be implemented with a single layer. However, an embodiment is not limited thereto. In an alternative embodiment, for example, the window WM may include a plurality of layers.

In an embodiment, although not illustrated in drawings, the bezel area BZA of the display device DD described above may correspond to an area that is defined by printing a material including a given color on one area of the window WM. In an embodiment of the disclosure, the window WM may include a light blocking pattern for defining the bezel area BZA. The light blocking pattern may be formed by a coating method, as a colored organic film.

The window WM may be coupled to the display module DM through an adhesive film. In an embodiment of the disclosure, the adhesive film may include an optically clear adhesive (OCA) film. However, the adhesive film is not limited thereto. In an alternative embodiment, for example, the adhesive film may include a typical adhesive or sticking agent. In an embodiment, for example, the adhesive film may include an optically clear resin (OCR) or a pressure sensitive adhesive (PSA) film.

An anti-reflection layer may be further disposed between the window WM and the display module DM. The anti-reflection layer decreases the reflectivity of external light incident from above the window WM. The anti-reflection layer according to an embodiment of the disclosure may include a retarder and a polarizer. The retarder may have a film type or a liquid crystal coating type and may include a $\lambda/2$ retarder and/or a $\lambda/4$ retarder. The polarizer may also be a polarizer of a film type or a liquid crystal coating type. The film type may include a stretch-type synthetic resin film, and the liquid crystal coating type may include liquid crystals arranged in a given direction. The retarder and the polarizer may be implemented with one polarization film.

In an embodiment of the disclosure, the anti-reflection layer may also include color filters. The arrangement of the color filters may be determined in consideration of colors of light generated from a plurality of pixels included in the display panel DP. Also, the anti-reflection layer may further include a light blocking pattern.

The display module DM may display an image based on an electrical signal and may transmit/receive information about an external input. The display module DM may be defined by an active area AA and an inactive area NAA. The active area AA may be defined as an area in which the image IM from the display panel DP is displayed. Also, the active area AA may be defined as an area in which the input sensing layer ISP senses the external input TC. However, the disclosure is not limited thereto. In an embodiment, for example, an area where the image IM is displayed on the display panel DP may be different from an area where the input sensing layer ISP senses the external input TC.

The inactive area NAA is adjacent to the active area AA. In an embodiment, for example, the inactive area NAA may surround the active area AA. However, this is illustrated by way of example. The inactive area NAA may be defined in various shapes, not limited to one embodiment. In an alternative embodiment, for example, the inactive area NAA may be provided adjacent to one side or opposite sides of the active area AA. According to an embodiment, the active area AA of the display module DM may correspond to at least part of the transparent area TA, and the non-display area NDA may correspond to at least part of the bezel area BZA.

According to an embodiment of the disclosure, the display panel DP may include a light emitting display panel. In an embodiment, for example, the display panel DP may be an organic light emitting display panel, an inorganic light emitting display panel or a quantum dot light emitting display panel. An emission layer of the organic light emitting display layer may include an organic light emitting material. An emission layer of the inorganic light emitting display panel may include an inorganic light emitting material. An emission layer of the quantum dot light emitting display panel may include a quantum dot, a quantum rod, or the like. Hereinafter, for convenience of description, embodiments where the display panel DP is an organic light emitting display panel will be described.

The input sensing layer ISP may be disposed on the display panel DP to sense the external input TC. The input sensing layer ISP may have a multilayer structure. The input sensing layer ISP may be defined by a single insulating layer or multiple insulating layers. In an embodiment of the disclosure, the input sensing layer ISP may include a single-layer or multi-layered conductive layer including a plurality of conductive patterns. In an embodiment of the disclosure, the conductive patterns may include a plurality of scan electrodes for detecting the external input TC and a plurality of signal lines connected to the plurality of scan electrodes. In an embodiment of the disclosure, the input sensing layer ISP may be directly disposed on the display panel DP. According to an embodiment of the disclosure, the input sensing layer ISP may be formed on the display panel DP by a subsequent process. That is, when the input sensing layer ISP is directly disposed on the display panel DP, an adhesive film may not be interposed between the input sensing layer ISP and the display panel DP. However, the disclosure is not limited thereto. In an alternative embodiment, the adhesive film may be interposed between the input sensing layer ISP and the display panel DP. In such an embodiment, the input sensing layer ISP is not manufactured together with the display panel DP through the subsequent processes. That is, the input sensing layer ISP may be manufactured through a process separate from that of the display panel DP and may then be fixed on an upper surface of the display panel DP by the adhesive film.

In an embodiment of the disclosure, the display device DD may further include a driver chip DRC and a flexible circuit film FCB. In an embodiment of the disclosure, the display panel DP may further include a pad area PP extending from the inactive area NAA.

Pads may be positioned in the pad area PP. The display panel DP may be electrically connected to the flexible circuit film FCB through the pads. However, the disclosure is not limited thereto. Alternatively, some of components included in the driver chip DRC may be mounted in the pad area PP.

In an embodiment of the disclosure, the driver chip DRC may be mounted on the flexible circuit film FCB. The flexible circuit film FCB may include a plurality of driving elements. The plurality of driving elements may include a circuit unit for driving the display panel DP. In an embodiment of the disclosure, the pad area PP may be bent to be positioned on a rear surface of the display panel DP.

The external case EDC may be coupled to the window WM to define an exterior appearance of the display device DD. The external case EDC may absorb external shocks from the outside and may prevent a foreign material/moisture or the like from being infiltrated into the display module DM such that components accommodated in the external case EDC are protected. In an embodiment of the disclosure, the external case EDC may be implemented by coupling a plurality of accommodating members.

The display device DD according to an embodiment may further include an electronic module including various functional modules for operating the display module DM, a power supply module for supplying a power used for overall operations of the display device DD, a bracket coupled with the external case EDC to partition an inner space of the display device DD, and the like.

Figure 3:
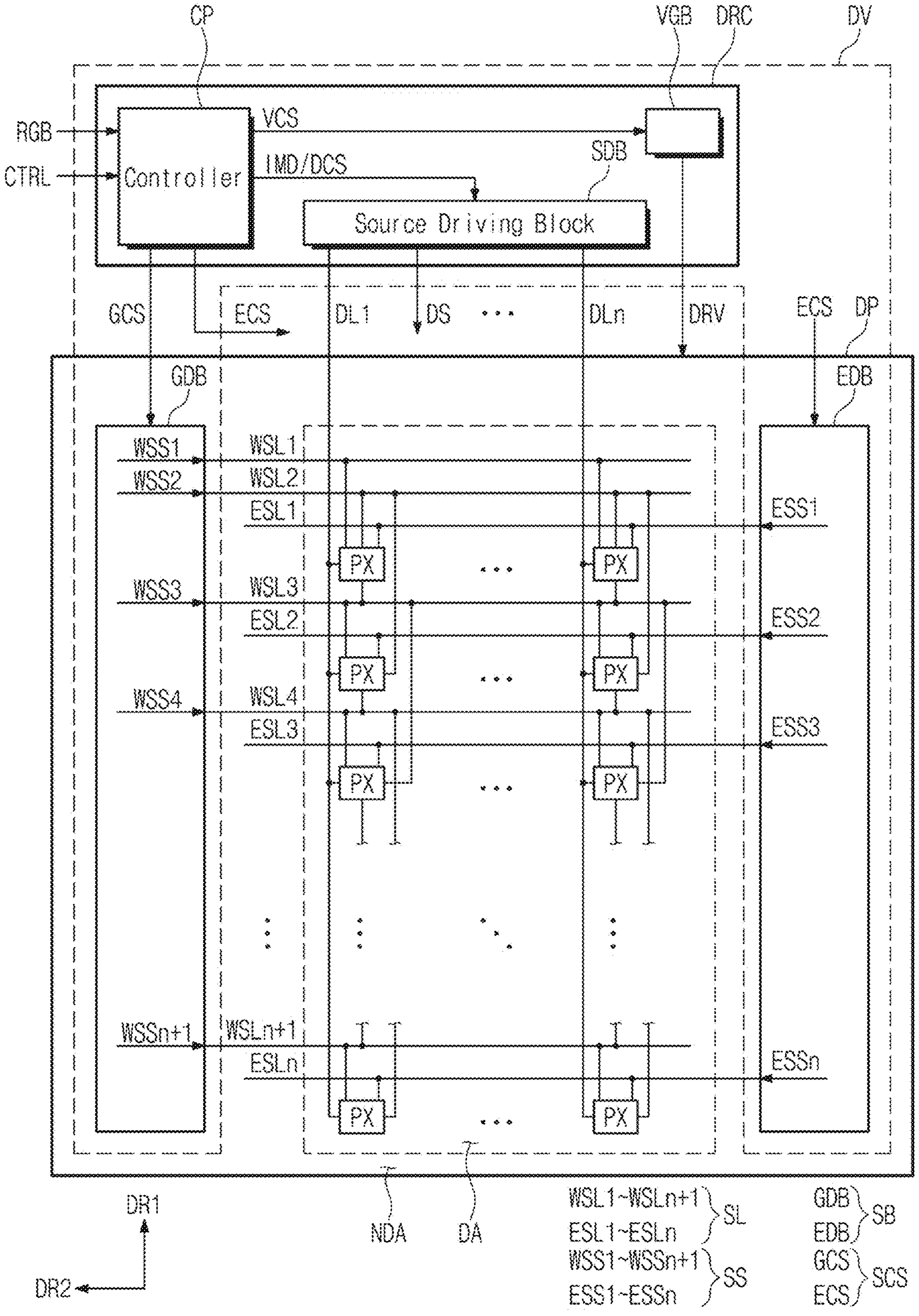
FIG. 3 is a block diagram of a display device, according to an embodiment of the disclosure.

FIG. 3 is a block diagram of a display device, according to an embodiment of the disclosure.

Referring to FIG. 3, an embodiment of the display device DD includes the display panel DP and a driver (or a display panel driver) DV. The driver DV controls the driving of the display panel DP.

In an embodiment of the disclosure, the driver DV includes the driver chip DRC and a scan block SB. The driver chip DRC receives external signals RGB and CTRL, and generates a data signal DS and a scan control signal SCS, which correspond to the display panel DP, based on the external signals RGB and CTRL. In such an embodiment, the external signals RGB and CTRL include the image signal RGB and the external control signal CTRL. The driver chip DRC generates the data signal DS based on the image signal RGB and generates the scan control signal SCS based on the external control signal CTRL. The scan block SB generates a scan signal SS for displaying the image IM (see FIG. 1) on the display panel DP. The display panel DP may display the image IM based on the data signal DS and the scan signal SS. In an embodiment of the disclosure, the scan signal SS may include write scan signals WSS1 to WSSn+1 and emission scan signals ESS1 to ESSn.

In an embodiment of the disclosure, the driver chip DRC includes a controller CP, a source driving block SDB, and a voltage generation block VGB.

The controller CP receives the image signal RGB and the external control signal CTRL from an outside. The controller CP generates an image data signal IMD that is obtained by converting the data format of the image signal RGB to be suitable for an interface specification with the source driving block SDB. The controller CP outputs the scan control signal SCS, a source control signal DCS, and a voltage control signal VCS based on the external control signal CTRL. In an embodiment of the disclosure, the scan control signal SCS includes a gate control signal GCS and an emission control signal ECS.

The source driving block SDB receives the source control signal DCS and the image data signal IMD from the controller CP. The source driving block SDB converts the image data signal IMD into the data signal DS, and outputs the data signal DS to a plurality of data lines DL1 to DLm to be described later. Here, m is a natural number greater than 1. The data signal DS refers to analog voltages corresponding to a gray scale value of the image data signal IMD.

The voltage generation block VGB generates a driving voltage DRV necessary for an operation of the display panel DP. In an embodiment of the disclosure, the driving voltage DRV may include an operating voltage and an initialization voltage that are provided to pixels PX to be described later. Although not shown in drawings, the voltage generation block VGB provides the driving voltage DRV to driving voltage lines electrically connected to the pixels PX. The pixels PX may emit light based on the data signal DS, the scan signal SS, and the driving voltage DRV.

In an embodiment of the disclosure, the scan block SB includes a gate driving block GDB and an emission driving block EDB. In an embodiment of the disclosure, the gate driving block GDB receives a gate control signal GCS from the controller CP. The gate driving block GDB generates the write scan signals WSS1 to WSSn+1 based on the gate control signal GCS and sequentially outputs the write scan signals WSS1 to WSSn+1 to a plurality of write scan lines WSL1 to WSLn+1 to be described later. Here, n is a natural number greater than 1. In an embodiment of the disclosure, the emission driving block EDB receives an emission control signal ECS from the controller CP. The emission driving block EDB generates the emission scan signals ESS1 to ESSn based on the emission control signal ECS, and sequentially outputs the emission scan signals ESS1 to ESSn to the plurality of emission scan lines ESL1 to ESLn to be described later.

The display panel DP may include a display area DA corresponding to the transparent area TA (see FIG. 1) and a non-display area NDA corresponding to the bezel area BZA (see FIG. 1).

The display panel DP may include a plurality of scan lines SL, the plurality of data lines DL1 to DLn, and the plurality of pixels PX. In an embodiment of the disclosure, the scan lines SL may include the plurality of write scan lines WSL1 to WSL1n+1 and the plurality of emission scan lines ESL1 to ESLn.

In an embodiment of the disclosure, the pixels PX are positioned within the display area DA. In an embodiment of the disclosure, the write scan lines WSL1 to WSLn+1 and the emission scan lines ESL1 to ESLn extend in the second direction DR2. The write scan lines WSL1 to WSLn+1 and the emission scan lines ESL1 to ESLn are arranged spaced from each other in the first direction DR1. The data lines DL1 to DLm extend in the first direction DR1 and are arranged spaced from one another in the second direction DR2.

In an embodiment, each of the pixels PX is electrically connected to three corresponding write scan lines among the write scan lines WSL1 to WSLn+1. In an embodiment, each of the pixels PX is electrically connected to one corresponding emission scan line among the emission scan lines ESL1 to ESLn and one corresponding data line among the data lines DL1 to DLn. However, a connection relationship between the pixels PX, the write scan lines WSL1 to WSLn+1, the emission scan lines ESL1 to ESLn, and the data lines DL1 to DLn may be changed depending on a configuration of the pixel circuit part of each of the pixels PX.

Each of the pixels PX includes a light emitting diode and a pixel circuit part controlling an emission operation of the light emitting diode. The pixel circuit part may include a plurality of transistors and a capacitor. Each of the pixels PX receives the driving voltage DRV from the voltage generation block VGB.

The pixels PX may include a plurality of groups, each of which has light emitting diodes that generate light of different colors from each other. in an embodiment, for example, the pixels PX may include red pixels that emit red light, green pixels generating green light, and blue pixels that emit blue light. A light emitting diode of a red pixel, a light emitting diode of a green pixel, and a light emitting diode of a blue pixel may include emission layers of different materials from each other. In an embodiment of the disclosure, each of the pixels PX may include white pixels that emit white light. In such an embodiment, an anti-reflection layer included in the display device DD may further include color filters. The display device DD may display the image IM (see FIG. 1) based on light output after the white light passes through the color filters. In an alternative embodiment of the disclosure, the pixels PX may include or be composed of blue pixels that emit blue light. In such an embodiment, the display device DD may display the image IM based on light output after the blue light passes through the color filters. In an embodiment of the disclosure, when the blue light passes through the color filters, the light pass therethrough may have a color having a wavelength different from that of the blue light. In an embodiment of the disclosure, each of the color filters may include a quantum dot. The quantum dot is a particle capable of adjusting the wavelength of light emitted after the wavelength of incident light is converted. The quantum dot may control the wavelength of light emitted depending on a particle size. Accordingly, the quantum dot may emit light having the red light, the green light, and the blue light.

The gate driving block GDB and the emission driving block EDB may be positioned in the non-display area NDA of the display panel DP. The gate driving block GDB sequentially supplies the write scan signals WSS1 to WSSn+1 to the write scan lines WSL1 to WSLn+1. The emission driving block EDB sequentially supplies the emission scan signals ESS1 to ESSn to the emission scan lines ESL1 to ESLn. Alternatively, the gate driving block GDB may be connected to the emission scan lines ESL1 to ESLn. In such an embodiment, the emission driving block EDB may be omitted, and the gate driving block GDB may output the emission scan signals ESS1 to ESSn to the emission scan lines ESL1 to ESLn.

Figure 4:
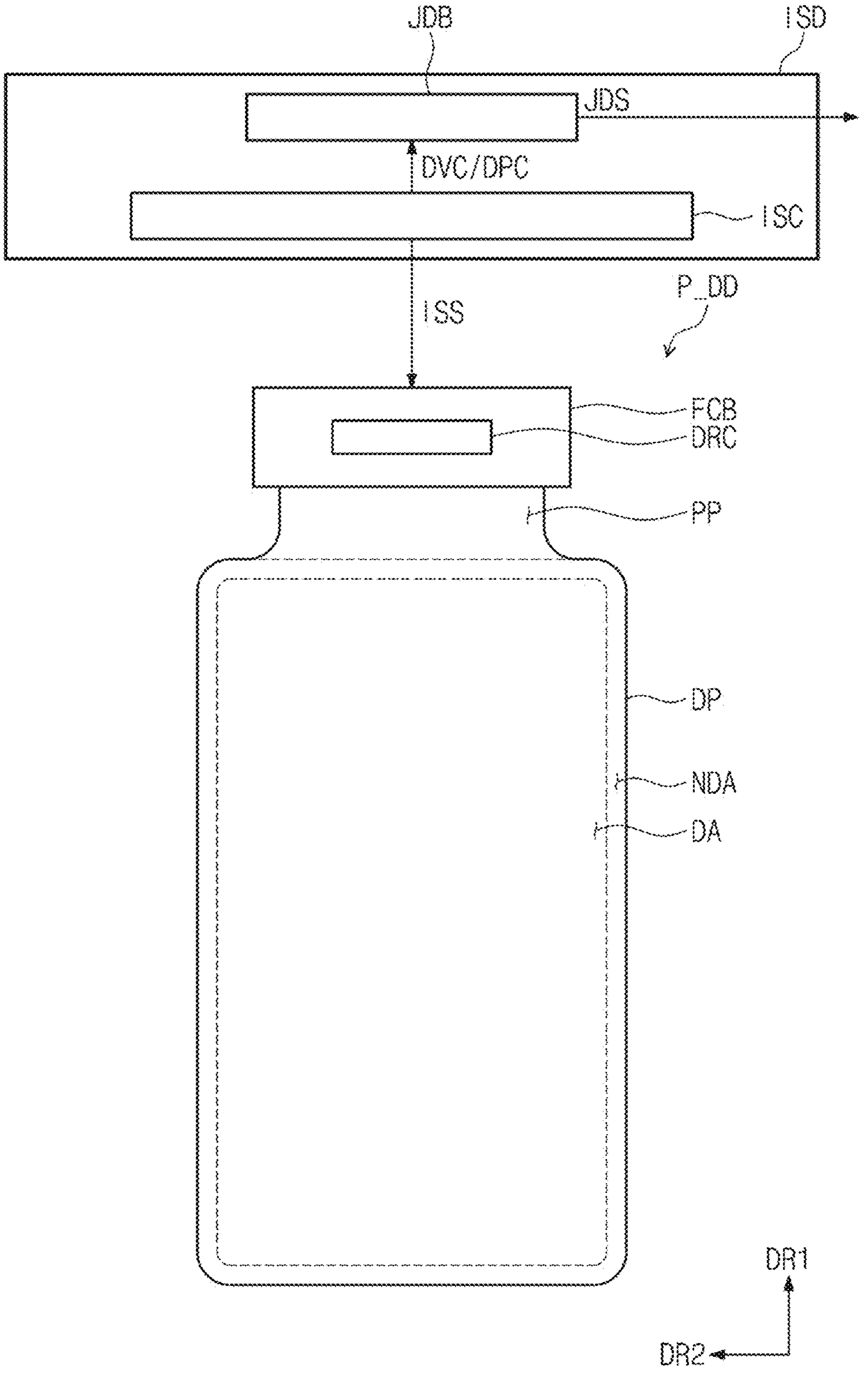
FIG. 4 is a block diagram of an inspection device, according to an embodiment of the disclosure.
Figure 5:
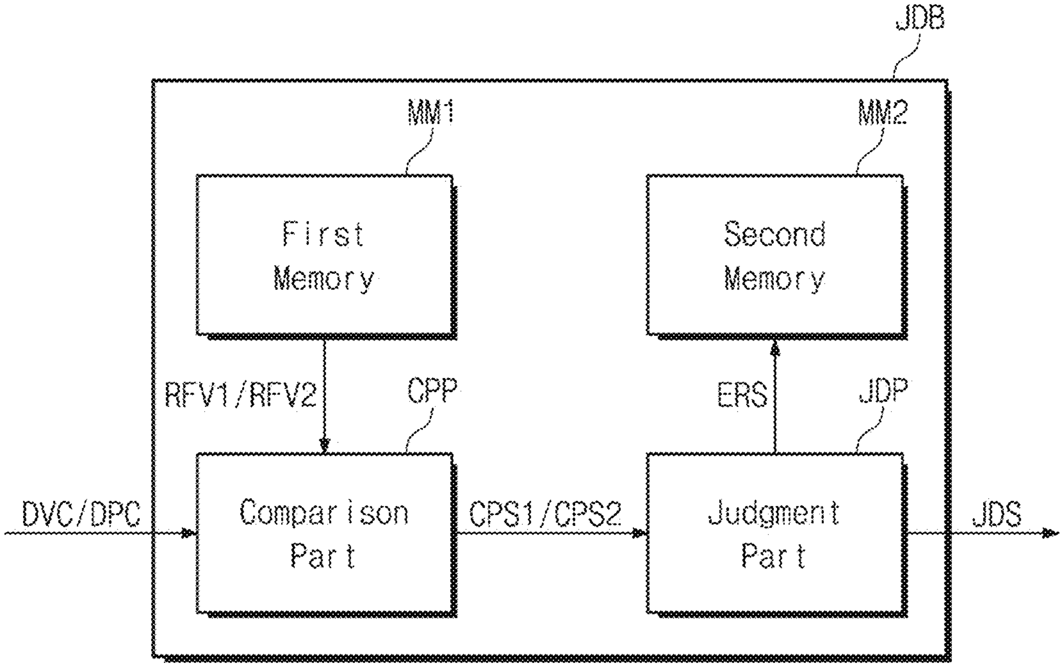
FIG. 5 is a block diagram illustrating a configuration of a judgment block, according to an embodiment of the disclosure.

FIG. 4 is a block diagram of an inspection device, according to an embodiment of the disclosure. FIG. 5 is a block diagram showing a configuration of a judgment block, according to an embodiment of the disclosure.

Referring to FIG. 4, in an embodiment of the disclosure, an inspection device ISD of the display device DD (see FIG. 1) includes an inspection controller ISC and a judgment block JDB. FIG. 4 shows the display panel DP, the flexible circuit film FCB, and the driver chip DRC, which are parts of configurations of the display device DD. Through the disclosure, in a process of manufacturing the display device DD, the display panel DP, the flexible circuit film FCB, and the driver chip DRC are manufactured, and then whether the display panel DP, the flexible circuit film FCB and the driver chip DRC are defective may be determined through the inspection device ISD. In such an embodiment, whether the display device DD including the display panel DP, the flexible circuit film FCB, and the driver chip DRC is defective may be determined. Hereinafter, for convenience of description, a state where the display panel DP, the flexible circuit film FCB, and the driver chip DRC among the display device DD are manufactured is referred to as a "preliminary display device P_DD". In addition, the inspection device ISD may determine whether the preliminary display device P_DD is defective. The display device DD may be manufactured by using the preliminary display device P_DD that is determined to be normal through the inspection device ISD. However, the disclosure is not limited thereto. In an alternative embodiment, for example, the inspection device ISD may determine whether the input sensing layer ISP manufactured in a process of manufacturing the display device DD is defective. Furthermore, it may be determined whether the display device DD manufactured is defective by the inspection device ISD.

The inspection device ISD provides an inspection signal ISS to the driver chip DRC. The inspection signal ISS may be the signal ISS for enabling the preliminary display device P_DD step by step (or on a step-by-step basis). While the preliminary display device P_DD is enabled through the inspection signal ISS step by step, the inspection device ISD measures currents DVC and DPC provided to the preliminary display device P_DD. The inspection device ISD generates a judgment signal JDS for determining whether configurations, which are activated at each step in which the preliminary display device P_DD is enabled and which are included in the preliminary display device P_DD, are defective, by analyzing the measured currents DVC and DPC. Hereinafter, for convenience of description, a case where the inspection device ISD determines whether the driver DV (see FIG. 3) including the display panel DP, the driver chip DRC, and the scan block SB (see FIG. 3) included in the display panel DP is defective will be described. In this case, whether the flexible circuit film FCB is defective may be determined together in a step (or process) of determining whether the driver DV is defective.

In such an embodiment, the inspection controller ISC provides the inspection signal ISS to the driver chip DRC. Through the inspection signal ISS, the inspection controller ISC may enable the driver DV, and may disable the display panel DP. Alternatively, the inspection controller ISC may enable the driver DV and the display panel DP through the inspection signal ISS. While only the driver DV is enabled, the inspection controller ISC measures the current DVC (hereinafter referred to as a "driving operating current") provided to the preliminary display device P_DD. Alternatively, while the driver DV and the display panel DP are enabled, the inspection controller ISC measures the current DPC (hereinafter referred to as a "display operating current") provided to the preliminary display device P_DD. The inspection controller ISC provides the measured driving operating current DVC and the measured display operating current DPC to the judgment block JDB. The judgment block JDB generates the judgment signal JDS for determining whether the driver DV or the display panel DP is defective, based on the driving operating current DVC and the display operating current DPC. In an embodiment, although not shown in FIG. 4, the inspection device ISD may further include a display part that receives the judgment signal JDS and then displays whether the driver DV or the display panel DP is defective. In an embodiment, the inspection device ISD may further include a separate current measurement part that measures an operating current MSC provided to the preliminary display device P_DD.

Referring to FIGS. 4 and 5, an embodiment of the judgment block JDB may include a comparison part CPP, a judgment part JDP, a first memory MM1, and a second memory MM2. In an embodiment of the disclosure, reference values RFV1 and RFV2 previously measured are stored in the first memory MM1. While only the driver DV in a normal state is enabled, the reference values RFV1 and RFV2 include the level of an operating current provided to the preliminary display device P_DD. While the driver DV and the display panel DP in a normal state are enabled, the reference values RFV1 and RFV2 include the level of an operating current provided to the preliminary display device P_DD. In an embodiment of the disclosure, while only the driver DV in a normal state is enabled, the reference value RFV may include the first reference value RFV1 that is an average value of the driving operating current DVC, which has been previously measured several times and which is provided to the preliminary display device P_DD. In such an embodiment, when the driver DV and the display panel DP in a normal state are enabled, the reference value RFV may include the second reference value RFV2 that is an average value of the display operating current DPC, which has been previously measured several times and which is provided to the preliminary display device P_DD.

The comparison part CPP receives the first and second reference values RFV1 and RFV2 from the first memory MM1 and receives the driving operating current DVC and the display operating current DPC from the inspection controller ISC. The comparison part CPP generates a first comparison signal CPS1 by comparing the first reference value RFV1 with the driving operating current DVC. The comparison part CPP generates a second comparison signal CPS2 by comparing the second reference value RFV2 with the display operating current DPC. In an embodiment of the disclosure, the comparison part CPP may generate the first comparison signal CPS1 based on a level difference between the driving operating current DVC and the first reference value RFV1. In such an embodiment, the comparison part CPP may generate the second comparison signal CPS2 based on a level difference between the display operating current DPC and the second reference value RFV2.

The judgment part JDP receives the first and second comparison signals CPS1 and CPS2 from the comparison part CPP. The judgment part JDP determines whether the driver DV or the display panel DP is defective, based on the first and second comparison signals CPS1 and CPS2. In an embodiment of the disclosure, on the basis of the first comparison signal CPS1 received while only the driver DV is enabled, the judgment part JDP may determine whether the driver DV is defective, by comparing the level difference between the driving operating current DVC and the first reference value RFV1 with a predetermined tolerance value. In an embodiment of the disclosure, when the level difference between the driving operating current DVC and the first reference value RFV1 is less than the tolerance value, the judgment part JDP may determine that the driver DV is normal. In an embodiment of the disclosure, when the level difference between the driving operating current DVC and the first reference value RFV1 is equal to or greater than the tolerance value, the judgment part JDP may determine that the driver DV is defective. In an embodiment of the disclosure, on the basis of the second comparison signal CPS2 received while the driver DV and the display panel DP are enabled, the judgment part JDP may determine whether the display panel DP is defective, by comparing the level difference between the display operating current DPC and the second reference value RFV2 with a predetermined tolerance value. In an embodiment of the disclosure, when the level difference between the display operating current DPC and the second reference value RFV2 is less than the tolerance value, the judgment part JDP may determine that the display panel DP is normal. In an embodiment of the disclosure, when the level difference between the display operating current DPC and the second reference value RFV2 is equal to or greater than the tolerance value, the judgment part JDP may determine that the display panel DP is defective.

In an embodiment of the disclosure, the tolerance value in a state where only the driver DV is enabled may be a value proportional to a standard deviation value of an operating current provided to the preliminary display device P_DD, which has been previously measured several times in a state where only the driver DV in the normal state is enabled. In an embodiment of the disclosure, the tolerance value in a state where the driver DV and the display panel DP are enabled may be a value proportional to a standard deviation value of an operating current provided to the preliminary display device P_DD, which has been previously measured several times in a state where the driver DV and the display panel DP in the normal state are enabled.

In an embodiment of the disclosure, when the level difference between the driving operating current DVC and the first reference value RFV1 is less than the first reference value RFV1 by the tolerance value or greater, the judgment part JDP may determine that there is an open-circuit fault in some of circuits included in the driver DV. When the level difference between the driving operating current DVC and the first reference value RFV1 is greater than the first reference value RFV1 by the tolerance value or greater, the judgment part JDP may determine that there is a short-circuit fault in some of circuits included in the driver DV.

In an embodiment of the disclosure, when the level difference between the display operating current DPC and the second reference value RFV2 is smaller than the second reference value RFV2 by a tolerance value or greater, the judgment part JDP may determine that there is an open-circuit fault in some of circuits included in the display panel DP. When the level difference between the display operating current DPC and the second reference value RFV2 is greater than the second reference value RFV2 by the tolerance value or greater, the judgment part JDP may determine that there is a short-circuit fault in some of circuits included in the display panel DP.

When it is determined that the driver DV or the display panel DP is defective, the judgment part JDP provides a defect information signal ERS to the second memory MM2. Accordingly, in a process of manufacturing the display device DD (see FIG. 1), information about defects that may occur in the driver DV or the display panel DP may be stored in the second memory MM2.

The judgment part JDP determines whether the preliminary display device P_DD is defective, based on the first and second comparison signals CSP1 and CSP2 and then generates the judgment signal JDS.

Figure 6:
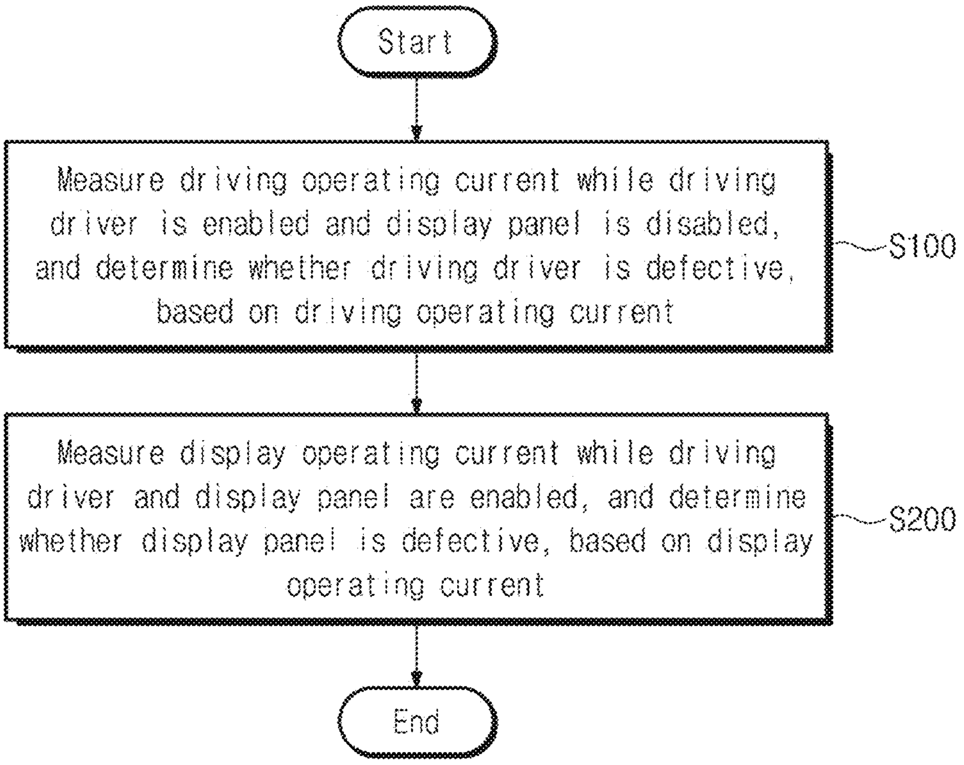
FIGS. 6 and 7 are flowcharts illustrating a method of testing a display device, according to an embodiment of the disclosure.
Figure 7:
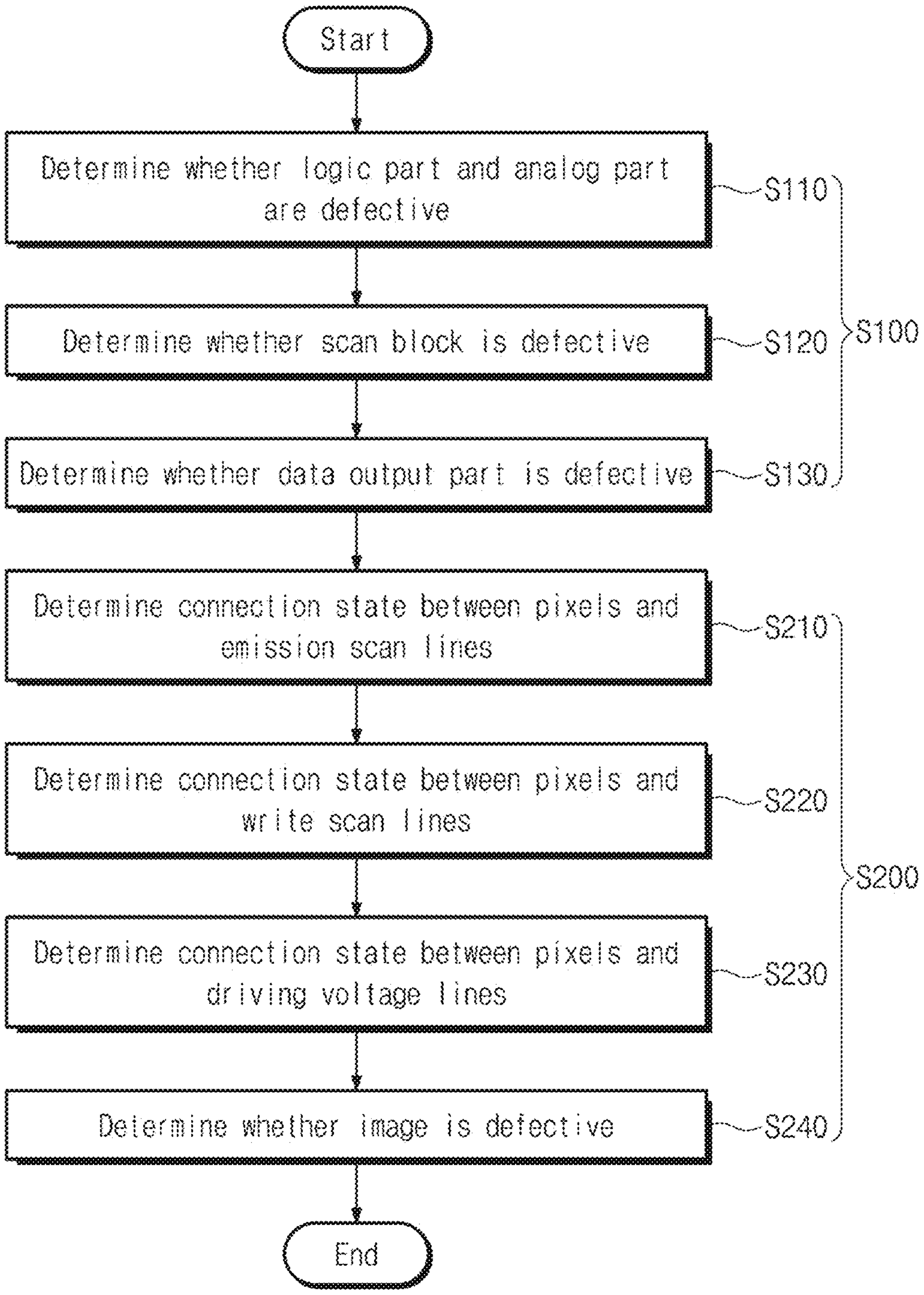

FIGS. 6 and 7 are flowcharts illustrating a method of testing a display device, according to an embodiment of the disclosure.

Referring to FIGS. 3, 4, 6, and 7, an embodiment of the method of testing the display device DD (see FIG. 1) includes operation S100 of measuring a current (hereinafter, referred to as a "driving operating current") provided to the preliminary display device P_DD by the inspection device ISD while the driver DV is enabled and the display panel DP is disabled, and determining whether the driver DV is defective, based on the measured driving operating current. In an embodiment of the disclosure, the method of testing the display device DD includes operation S200 of measuring a current (hereinafter, referred to as a "display operating current") provided to the preliminary display device P_DD by the inspection device ISD while the driver DV and the display panel DP are enabled and determining whether the display panel DP is defective, based on the measured display operating current. In an embodiment of the disclosure, operation S200 of determining whether the display panel DP is defective is performed after operation S100 of determining whether the driver DV is defective.

In an embodiment of the disclosure, the driver DV includes the driver chip DRC and the scan block SB. The driver chip DRC includes a logic part LGP (see FIG. 9A), an analog part ANP (see FIG. 9A), and a data output part DOP (see FIG. 9A).

In an embodiment, as shown in FIG. 7, operation S100 of determining whether the driver DV is defective includes operation S110 of determining whether the logic part LGP and the analog part ANP are defective, operation S120 of determining whether the scan block is defective, and operation S130 of determining whether the data output part DOP is defective. In an embodiment of the disclosure, operation S120 of determining whether the scan block SB is defective is performed after operation S110 of determining whether the logic part LGP and the analog part ANP are defective. Operation S130 of determining whether the data output part DOP is defective is performed after operation S120 of determining whether the scan block SB is defective. The logic part LGP, the analog part ANP, and the data output part DOP will be described later in detail with reference to FIG. 9A.

Operation S200 of determining whether the display panel DP is defective includes operation S210 of determining a connection state between the pixels PX and the emission scan lines ESL1 to ESLn, operation S220 of determining a connection state between the pixels PX and the write scan lines WSL1 to WSLn+1, operation S230 of determining a connection state between the pixels PX and driving voltage lines, and operation S240 of determining whether the image IM displayed on the display panel DP is defective. In an embodiment of the disclosure, operation S200 of determining whether the display panel DP is defective is performed after operation S100 of determining whether the driver DV is defective. Operation S220 of determining the connection state between the pixels PX and the write scan lines WSL1 to WSLn+1 is performed after operation S210 of determining the connection state between the pixels PX and the emission scan lines ESL1 to ESLn. In an embodiment where other scan lines are further included in addition to the write scan lines WSL1 to WSLn+1 and the emission scan lines ESL1 to ESLn, operation of determining a connection state between the other scan lines may be further performed. Operation S230 of determining the connection state between the pixels PX and the driving voltage lines is performed after operation S220 of determining the connection state between the pixels PX and the write scan lines WSL1 to WSLn+1. Operation S240 of determining whether the image IM displayed on the display panel DP is defective is performed after operation S230 of determining the connection state between the pixels PX and the driving voltage lines.

Figure 8A:
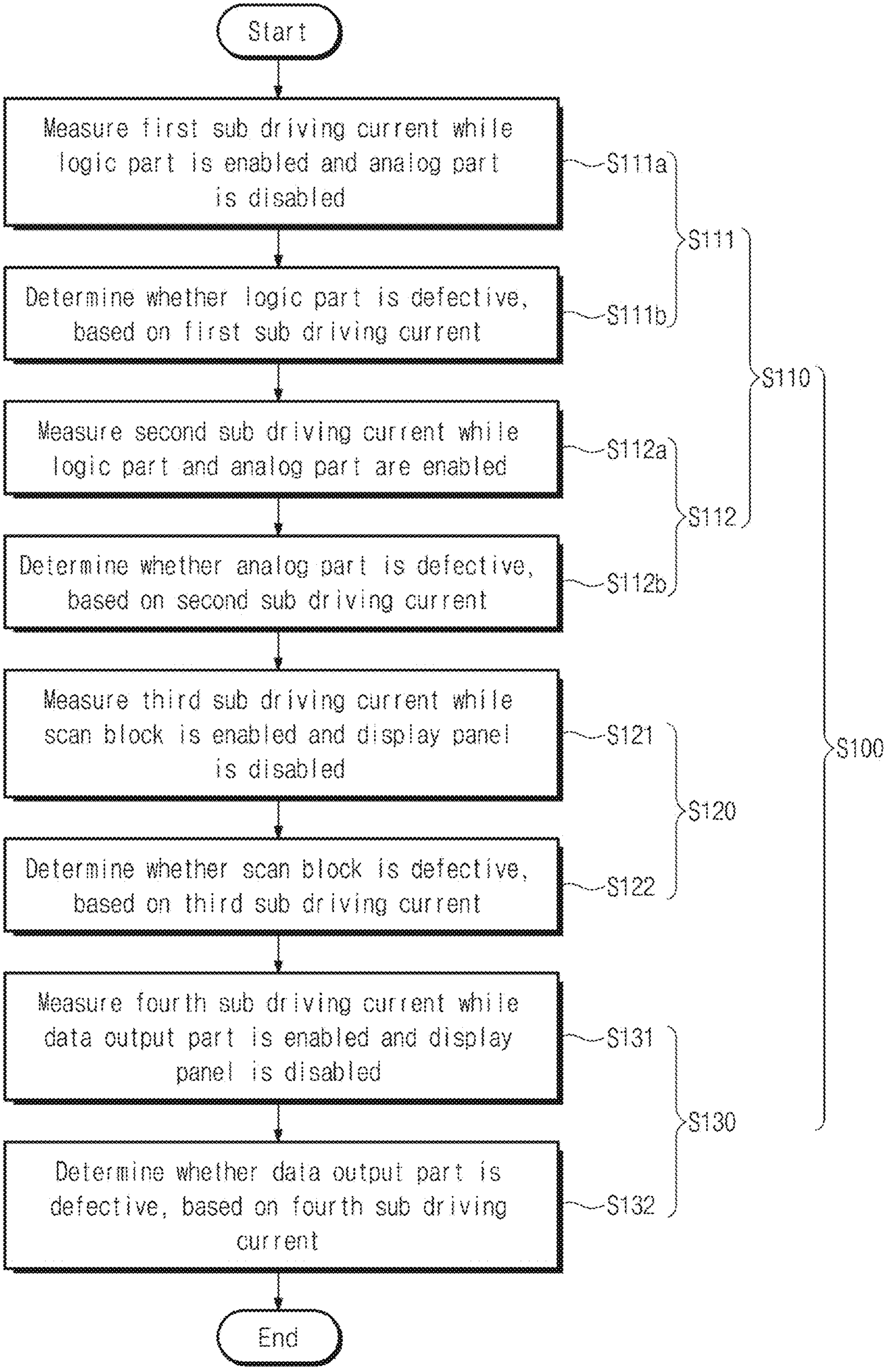
FIG. 8A is a flowchart illustrating a method of determining whether a driver is defective, according to an embodiment of the disclosure.
Figure 8B:
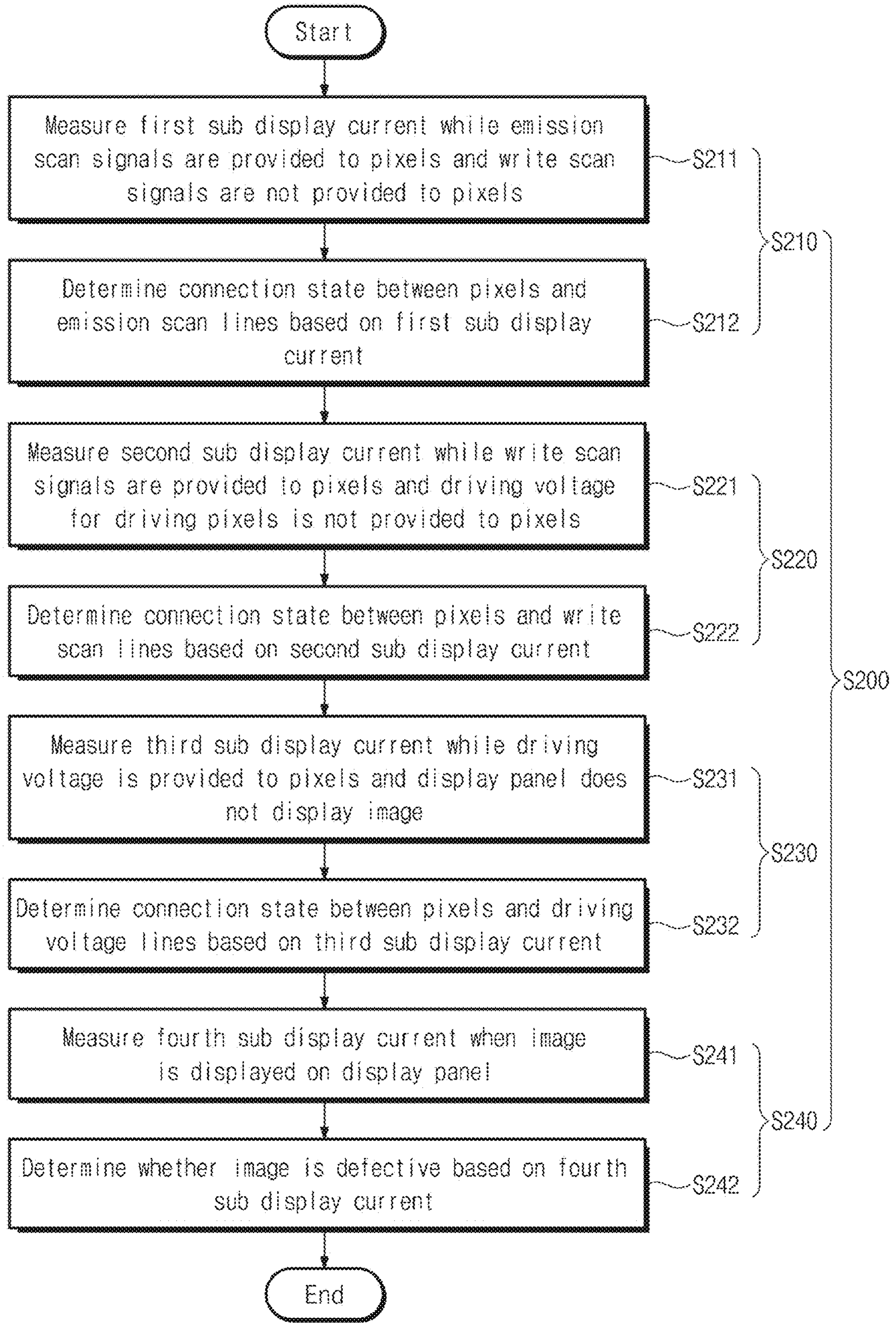
FIG. 8B is a flowchart illustrating a method of determining whether a display panel is defective, according to an embodiment of the disclosure.

FIG. 8A is a flowchart illustrating a method of determining whether a driver is defective, according to an embodiment of the disclosure. FIG. 8B is a flowchart illustrating a method of determining whether a display panel is defective, according to an embodiment of the disclosure. FIGS. 9A to 9H are conceptual diagrams illustrating a method of testing a display device, according to an embodiment of the disclosure. Hereinafter, configurations and signals that are the same as configurations and signals described above with reference to FIGS. 3 to 5 are marked by the same reference numerals, and thus, any repetitive detailed description will be omitted to avoid redundancy.

Figure 9A:
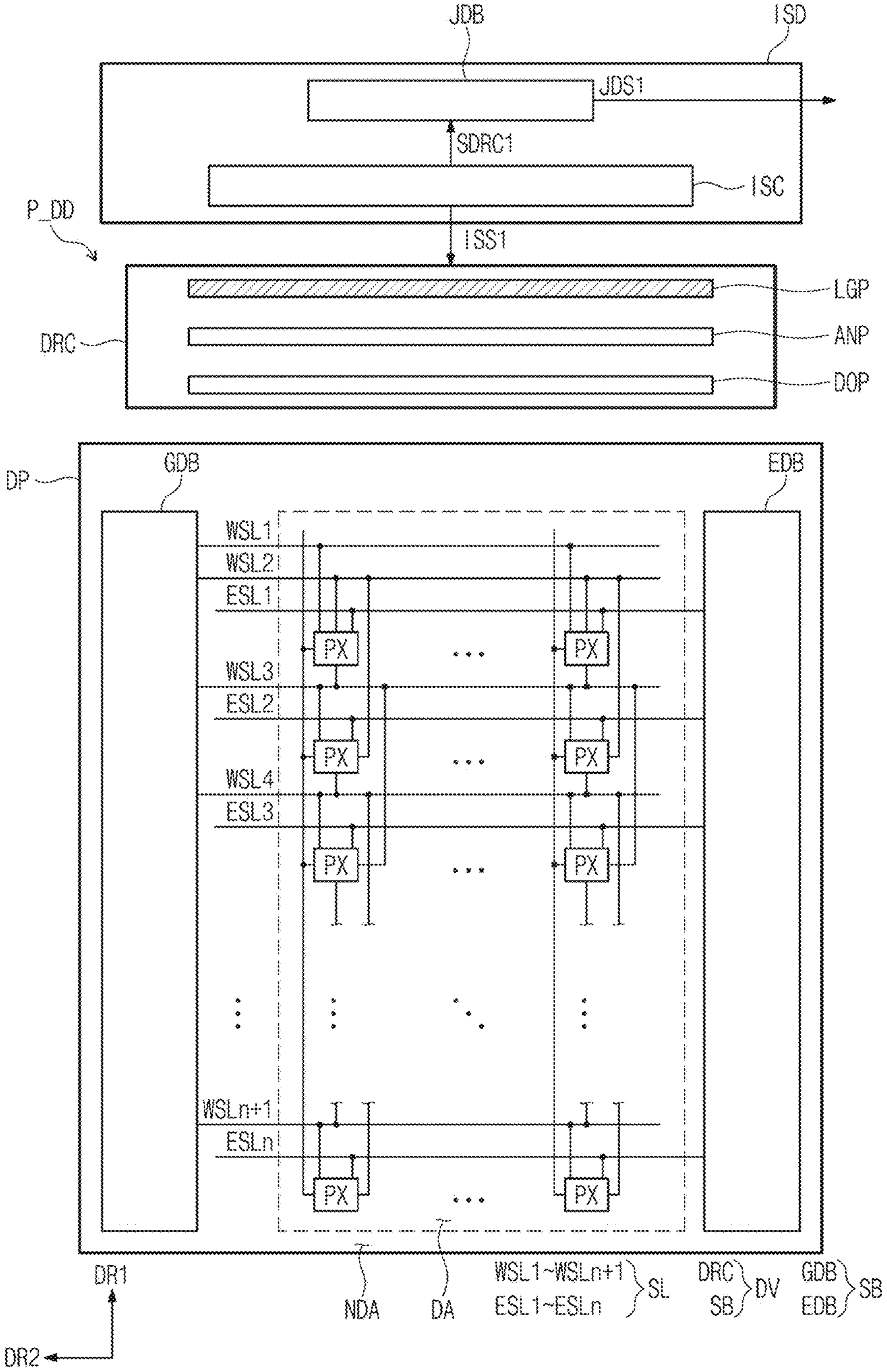
FIGS. 9A to 9H are conceptual diagrams for describing a method of testing a display device, according to an embodiment of the disclosure.

Referring to FIGS. 8A and 9A, the driver chip DRC includes the logic part LGP, the analog part ANP, and the data output part DOP. Operation S110 of determining whether the logic part LGP and the analog part ANP are defective includes operation S111 of determining whether the logic part LGP is defective and operation S112 of determining whether the analog part ANP is defective. In an embodiment of the disclosure, operation S112 of determining whether the analog part ANP is defective is performed after operation S111 of determining whether the logic part LGP is defective.

In an embodiment of the disclosure, referring to FIGS. 3 and 8A, a configuration that generates a digital signal to be provided to the display panel DP based on the image signal RGB and the external control signal CTRL, from among the controller CP, the source driving block SDB, and the voltage generation block VGB included in the driver chip DRC, may be referred to as the "logic part LGP". A configuration that generates an analog signal to be provided to the display panel DP based on the digital signal generated by the logic part LGP, from among the controller CP, the source driving block SDB, and the voltage generation block VGB included in the driver chip DRC, may be referred to as the "analog part ANP". In an embodiment of the disclosure, the digital signal includes the gate control signal GCS, the emission control signal ECS, the source control signal DCS, the voltage control signal VCS and the image data signal IMD. In an embodiment of the disclosure, the analog signals include the data signal DS and the driving voltage DRV. In an embodiment of the disclosure, a configuration that delivers the analog signal generated by the analog part ANP to the display panel DP, from among the controller CP, the source driving block SDB and the voltage generation block VGB included in the driver chip DRC, may be referred to as the "data output part DOP". In an embodiment of the disclosure, the data output part DOP may include a configuration such as a buffer.

Operation S111 of determining whether the logic part LGP is defective includes operation S111a of measuring a current SDRC1 (hereinafter, referred to as a "first sub driving current") provided to the preliminary display device P_DD while the logic part LGP is enabled and the analog part ANP is disabled, and operation S111b of determining whether the logic part LGP is defective, based on the first sub driving current SDRC1. In an embodiment of the disclosure, the inspection controller ISC may provide the driver chip DRC with a first inspection signal ISS1 for enabling only the logic part LGP. In an embodiment of the disclosure, the first inspection signal ISS1 may include a voltage for turning on the logic part LGP. In embodiments of the disclosure, a defect may be effectively prevented from occurring in the display device DD manufactured using the preliminary display device P_DD including the logic part LGP, in which a defect may occur, by determining whether the logic part LGP included in the preliminary display device P_DD is defective.

Figure 9B:
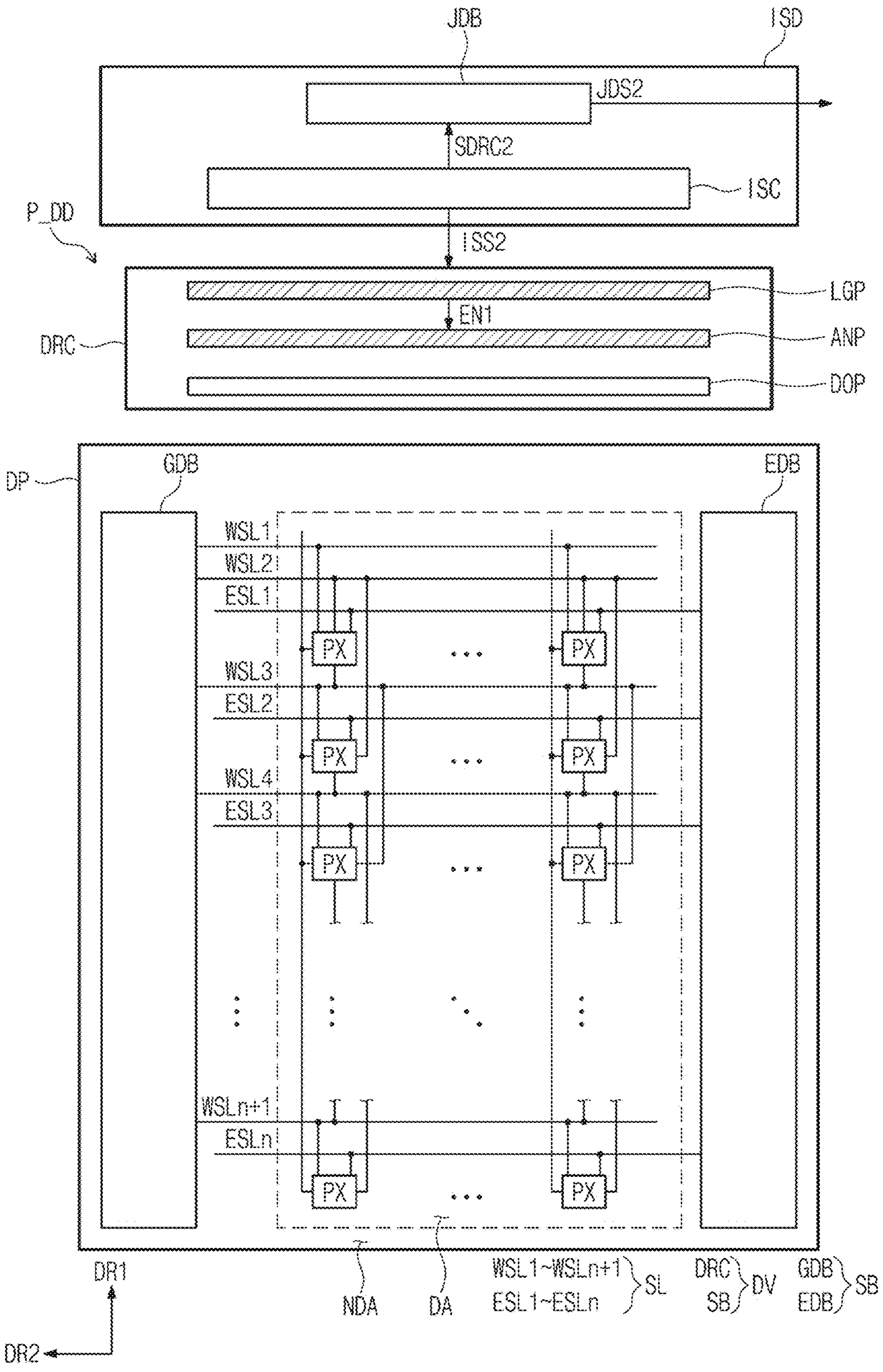

In an embodiment of the disclosure, referring to FIGS. 8A and 9B, operation S112 of determining whether the analog part ANP is defective includes operation S112a of measuring a current SDRC2 (hereinafter, referred to as a "second sub driving current") provided to the preliminary display device P_DD while the logic part LGP and the analog part ANP are enabled, and operation S112b of determining whether the analog part ANP is defective, based on the second sub driving current SDRC2. In an embodiment of the disclosure, the inspection controller ISC may provide the driver chip DRC with a second inspection signal ISS2 for enabling the logic part LGP and the analog part ANP. In an embodiment of the disclosure, the second inspection signal ISS2 may include a voltage for enabling the logic part LGP and the analog part ANP. In an embodiment of the disclosure, when receiving the second inspection signal ISS2, the logic part LGP generates a first output signal EN1 for enabling the analog part ANP, and provides the first output signal EN1 to the analog part ANP. In embodiments of the disclosure, a defect may be effectively prevented from occurring in the display device DD manufactured using the preliminary display device P_DD including the analog part ANP in which a defect may occur, by determining whether the analog part ANP included in the preliminary display device P_DD is defective.

Figure 9C:
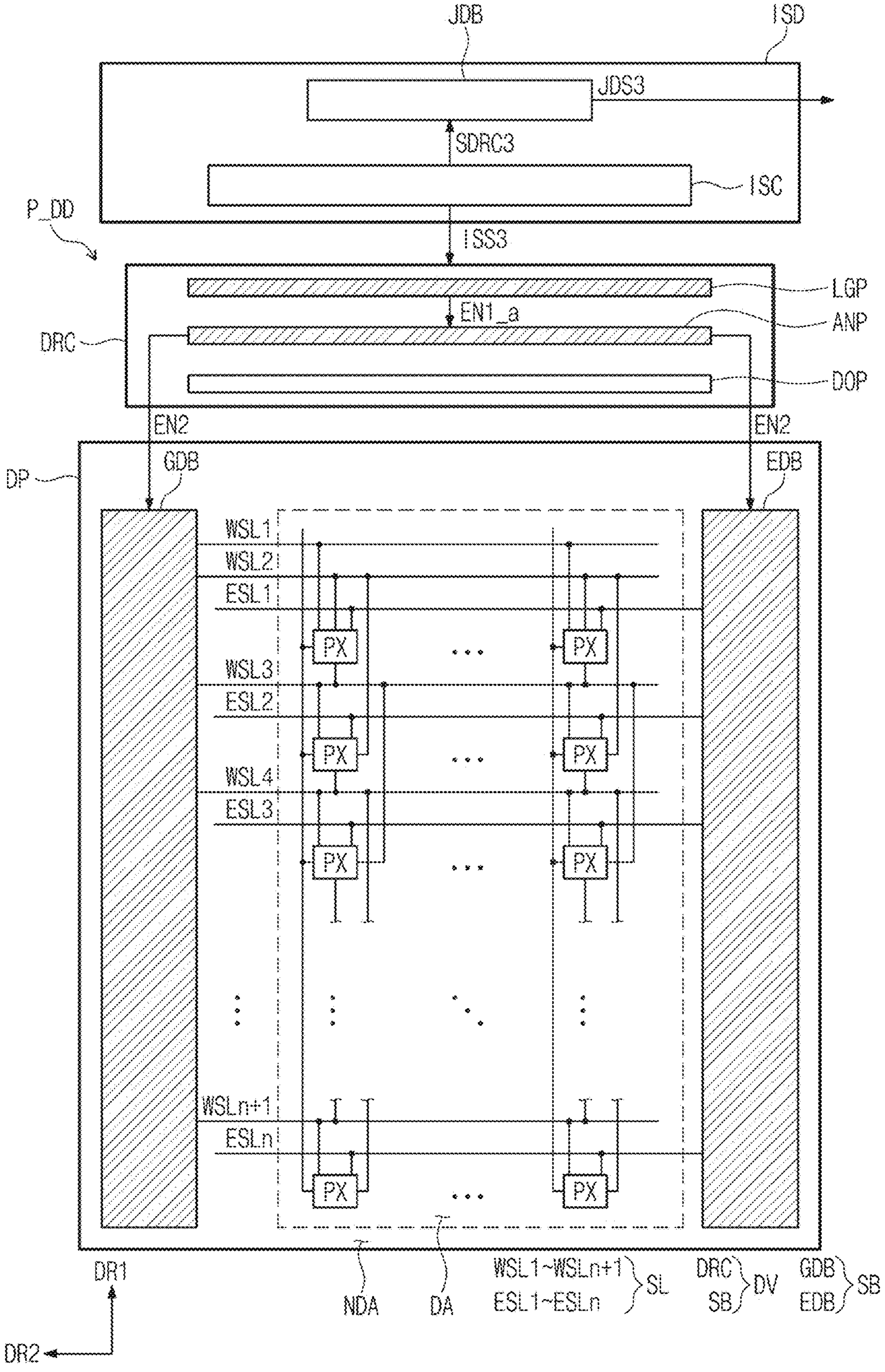

In an embodiment of the disclosure, referring to FIGS. 8A and 9C, operation S120 of determining whether the scan block SB is defective is performed after operation S112 of determining whether the analog part ANP is defective. Operation S120 of determining whether the scan block SB is defective includes operation S121 of measuring a current SDRC3 (hereinafter referred to as a "third sub driving current") provided to the preliminary display device P_DD while the scan block SB is enabled and the display panel DP is disabled, and operation S122 of determining whether the scan block SB is defective, based on the third sub driving current SDRC3. In an embodiment of the disclosure, the inspection controller ISC may provide the driver chip DRC with a third inspection signal ISS3 for enabling the scan block SB. In an embodiment of the disclosure, the third inspection signal ISS3 may include a voltage for enabling the logic part LGP, the analog part ANP, and the scan block SB. In an embodiment of the disclosure, when the logic part LGP receives the third inspection signal ISS3, the logic part LGP generates a first output signal EN1_a for enabling the analog part ANP, and provides the first output signal EN1_a to the analog part ANP. When the analog part ANP receives the first output signal EN1_a, the analog part ANP generates a second output signal EN2 for enabling the scan block SB, and provides the second output signal EN2 to the scan block SB. In an embodiment, as illustrated in FIG. 9C, the analog part ANP may generate and provide the second output signal EN2 to the scan block SB, but the disclosure is not limited thereto. Alternatively, when the logic part LGP receives the third inspection signal ISS3, the logic part LGP may generate first and second output signals, and may respectively provide the first and second output signals to the analog part ANP and the scan block SB. In embodiments of the disclosure, a defect may be effectively prevented from occurring in the display device DD manufactured using the preliminary display device P_DD including the scan block SB in which a defect may occur, by determining whether the scan block SB included in the preliminary display device P_DD is defective.

Figure 9D:
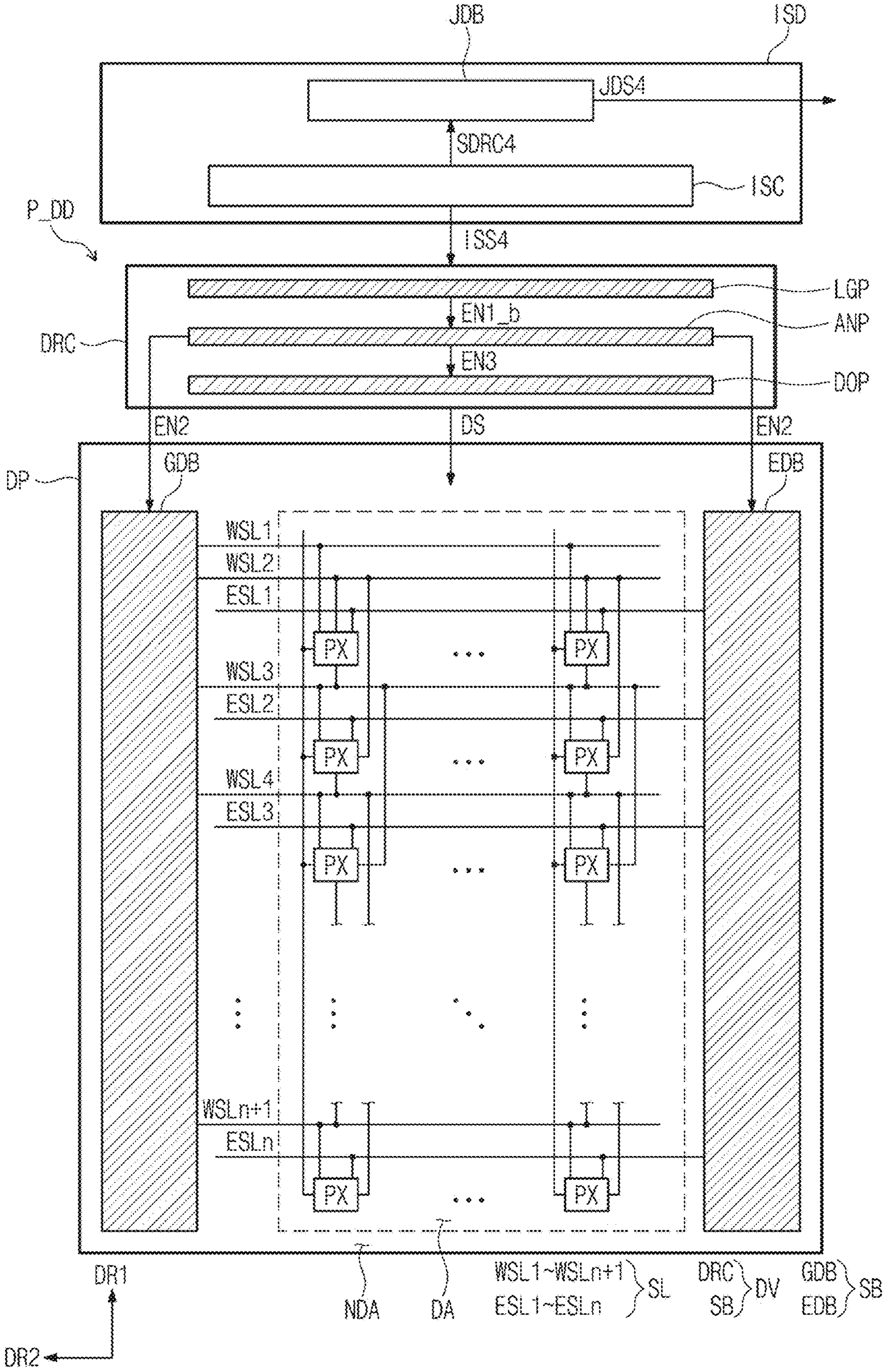

In an embodiment of the disclosure, referring to FIGS. 8A and 9D, operation S130 of determining whether the data output part DOP is defective is performed after operation S120 of determining whether the scan block SB is defective. Operation S130 of determining whether the data output part DOP is defective includes operation S131 of measuring a current SDRC4 (hereinafter referred to as a "fourth sub driving current") provided to the preliminary display device P_DD while the data output part DOP is enabled and the display panel DP is disabled, and operation S132 of determining whether the data output part DOP is defective, based on the fourth sub driving current SDRC4. In an embodiment of the disclosure, the inspection controller ISC may provide the driver chip DRC with a fourth inspection signal ISS4 for enabling the data output part DOP. In an embodiment of the disclosure, the fourth inspection signal ISS4 may include a voltage for enabling the logic part LGP, the analog part ANP, the scan block SB, and the data output part DOP. In an embodiment of the disclosure, when the logic part LGP receives the fourth inspection signal ISS4, the logic part LGP generates a first output signal EN1_b for enabling the analog part ANP, and provides the first output signal EN1_b to the analog part ANP. When the analog part ANP receives the first output signal EN1_b, the analog part ANP generates the second output signal EN2 for enabling the scan block SB and a third output signal EN3 for enabling the data output part DOP. The analog part ANP provides the second output signal EN2 to the scan block SB, and provides the third output signal EN3 to the data output part DOP. When the data output part DOP receives the third output signal EN3, the data output part DOP may provide the data signal DS to the display panel DP. In an embodiment, as illustrated in FIG. 9D, the analog part ANP may generate and provide the second and third output signals EN2 and EN3, but the disclosure is not limited thereto. Alternatively, when the logic part LGP receives the fourth inspection signal ISS4, the logic part LGP may generate first to third output signals, and may respectively provide the first to third output signals to the analog part ANP, the scan block SB, and the data output part DOP. In embodiments of the disclosure, a defect may be effectively prevented from occurring in the display device DD manufactured using the preliminary display device P_DD including the data output part DOP in which a defect may occur, by determining whether the data output part DOP included in the preliminary display device P_DD is defective.

Figure 9E:
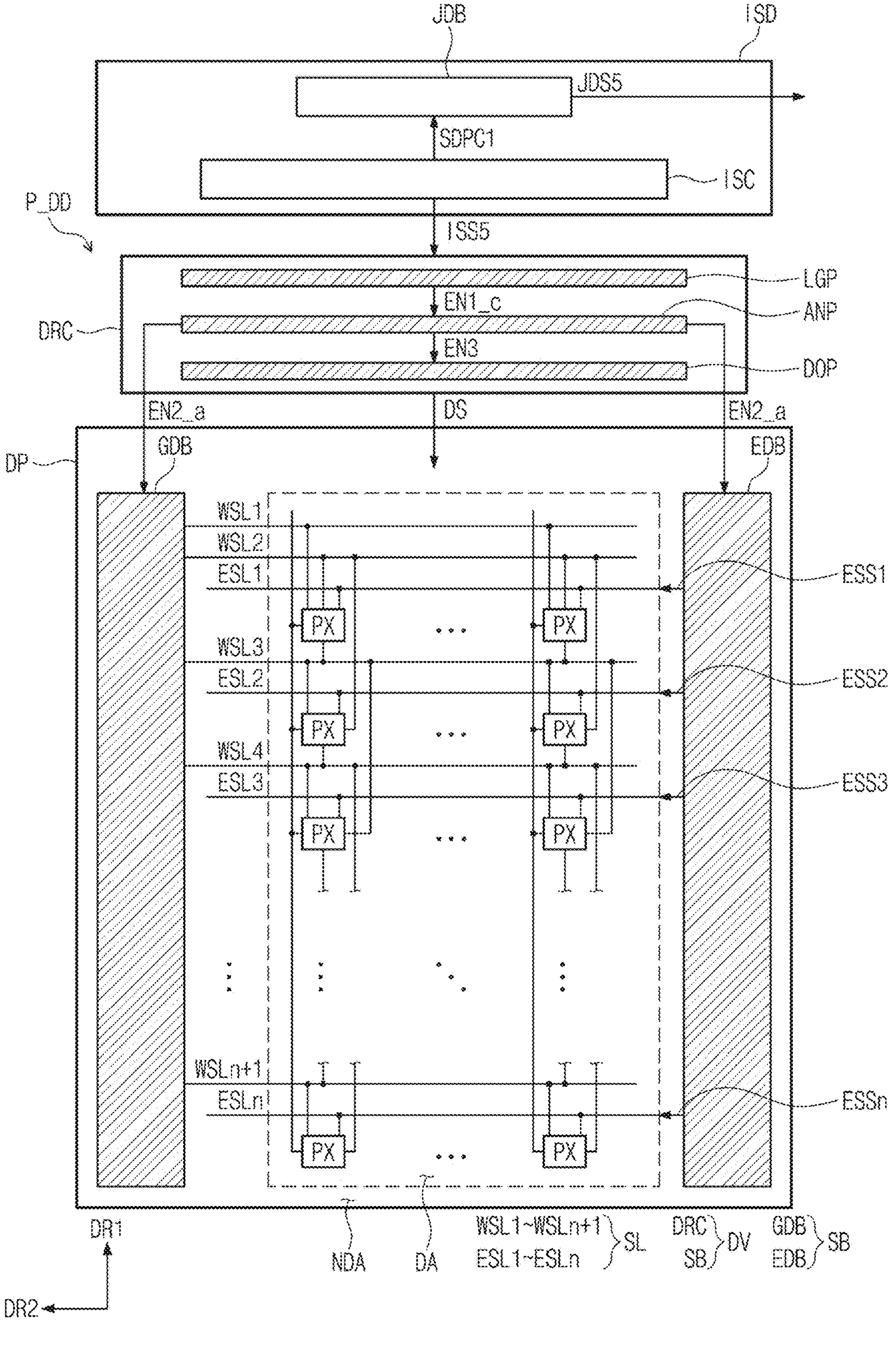

Referring to FIGS. 8B and 9E, operation S210 of determining a connection state between the pixels PX and the emission scan lines ESL1 to ESLn is performed after operation S100 (see FIG. 8A) of determining whether the DV is defective. Operation S210 of determining the connection state between the pixels PX and the emission scan lines ESL1 to ESLn includes operation S211 of measuring a current SDPC1 (hereinafter, referred to as a "first sub display current") provided to the preliminary display device P_DD while the emission scan signals ESS1 to ESSn are provided to the pixels PX and the write scan signals WSS1 to WSSn+1 are not provided to the pixels PX, and operation S212 of determining a connection state between the pixels PX and the emission scan lines ESL1 to ESLn based on the first sub display current SDPC1. In an embodiment of the disclosure, the inspection controller ISC may provide the driver chip DRC with a fifth inspection signal ISS5 for providing the emission scan signals ESS1 to ESSn to the pixels PX. In an embodiment of the disclosure, the fifth inspection signal ISS5 may include a voltage for enabling the logic part LGP, the analog part ANP, the scan block SB, and the data output part DOP and for providing the emission scan signals ESS1 to ESSn to the pixels PX. In an embodiment of the disclosure, when the logic part LGP receives the fifth inspection signal ISS5, the logic part LGP generates a first output signal EN1_c for enabling the analog part ANP, and provides the first output signal EN1_c to the analog part ANP. When the analog part ANP receives the first output signal EN1_c, the analog part ANP generates a second output signal EN2_a for enabling the scan block SB and the third output signal EN3 for enabling the data output part DOP. The analog part ANP provides the second output signal EN2_a to the scan block SB, and provides the third output signal EN3 to the data output part DOP. When the scan block SB receives the second output signal EN2_a, the scan block SB provides the emission scan signals ESS1 to ESSn to the pixels PX. In an embodiment, as illustrated in FIG. 9E, the analog part ANP may generate and provide the second and third output signals EN2_a and EN3, but the disclosure is not limited thereto. Alternatively, when the logic part LGP receives the fifth inspection signal ISS5, the logic part LGP may generate first to third output signals, and may respectively provide the first to third output signals to the analog part ANP, the scan block SB, and the data output part DOP. In embodiments of the disclosure, a defect may be effectively prevented from occurring in the display device DD manufactured using the preliminary display device P_DD including the pixels PX in which a connection defect to the emission scan lines ESL1 to ESLn may occur, by determining whether a connection between the pixels PX included in the preliminary display device P_DD and the emission scan lines ESL1 to ESLn is defective.

Figure 9F:
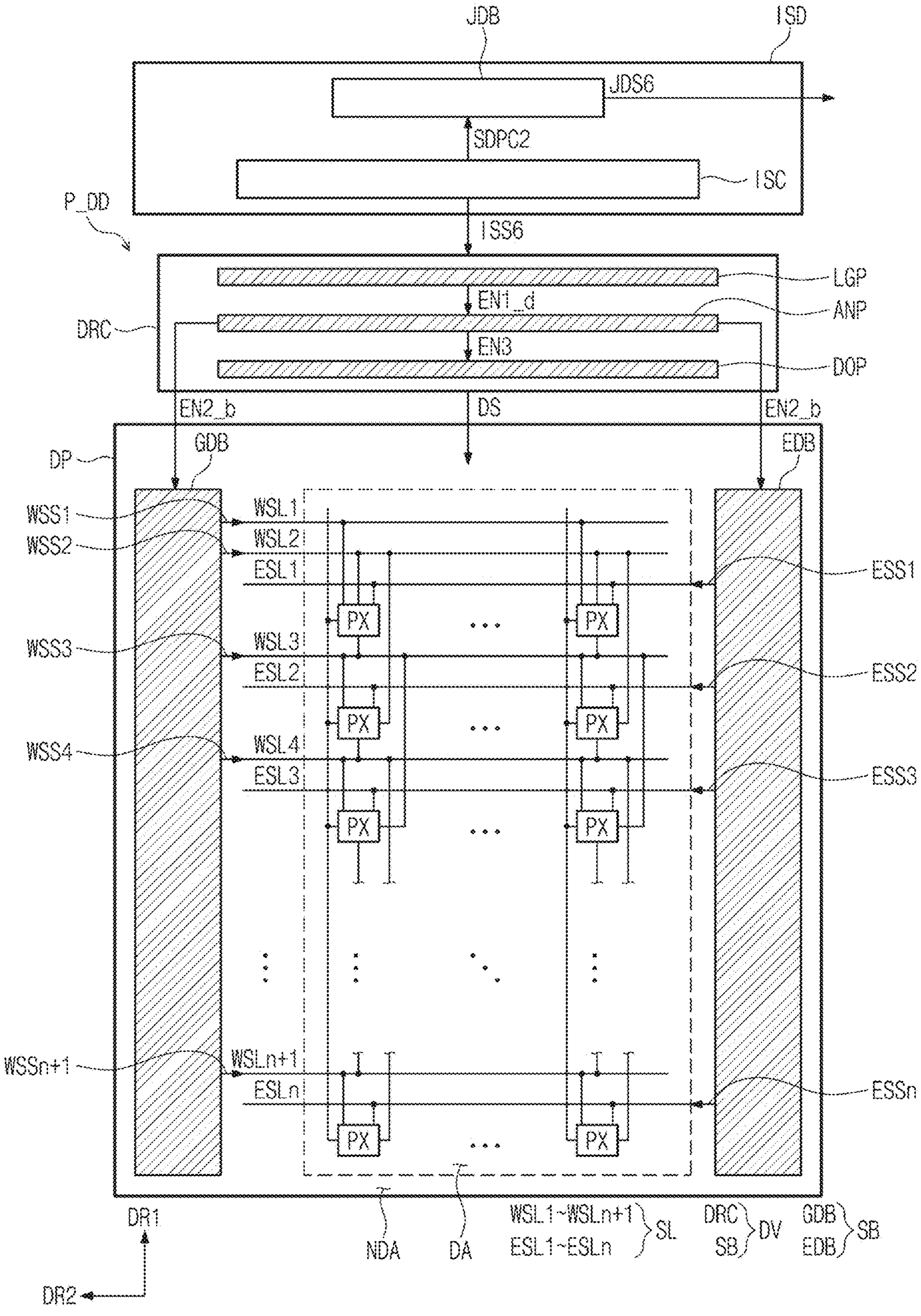

Referring to FIGS. 8B and 9F, operation S220 of determining the connection state between the pixels PX and the write scan lines WSL1 to WSLn+1 is performed after operation S210 of determining the connection state between the pixels PX and the emission scan lines ESL1 to ESLn. Operation S220 of determining the connection state between the pixels PX and the write scan lines WSL1 to WSLn+1 includes operation S221 of measuring a current SDPC2 (hereinafter, referred to as a "second sub display current") provided to the preliminary display device P_DD while the write scan signals WSS1 to WSSn+1 are provided to the pixels PX and the driving voltage DRV (see FIG. 9G) is not provided to the pixels PX, and operation S222 of determining a connection state between the pixels PX and the write scan lines WSL1 to WSLn+1 based on the second sub display current SDPC2.

In an embodiment of the disclosure, the inspection controller ISC may provide the driver chip DRC with a sixth inspection signal ISS6 for providing the write scan signals WSS1 to WSSn+1 to the pixels PX. In an embodiment of the disclosure, the sixth inspection signal ISS6 may include a voltage for enabling the logic part LGP, the analog part ANP, the scan block SB, and the data output part DOP and for providing the emission scan signals ESS1 to ESSn and the write scan signals WSS1 to WSSn+1 to the pixels PX. In an embodiment of the disclosure, when the logic part LGP receives the sixth inspection signal ISS6, the logic part LGP generates a first output signal EN1_d for enabling the analog part ANP, and provides the first output signal EN1_d to the analog part ANP. When the analog part ANP receives the first output signal EN1_d, the analog part ANP generates the second output signal EN2_b for enabling the scan block SB and the third output signal EN3 for enabling the data output part DOP. The analog part ANP provides the second output signal EN2_b to the scan block SB, and provides the third output signal EN3 to the data output part DOP. When the scan block SB receives the second output signal EN2_b, the scan block SB provides the emission scan signals ESS1 to ESSn and the write scan signals WSL1 to WSLn+1 to the pixels PX. In embodiments of the disclosure, a defect may be effectively prevented from occurring in the display device DD manufactured using the preliminary display device P_DD including the pixels PX in which a connection defect to the write scan lines WSL1 to WSLn+1 may occur, by determining whether a connection between the pixels PX included in the preliminary display device P_DD and the write scan lines WSL1 to WSLn+1 is defective.

Figure 9G:
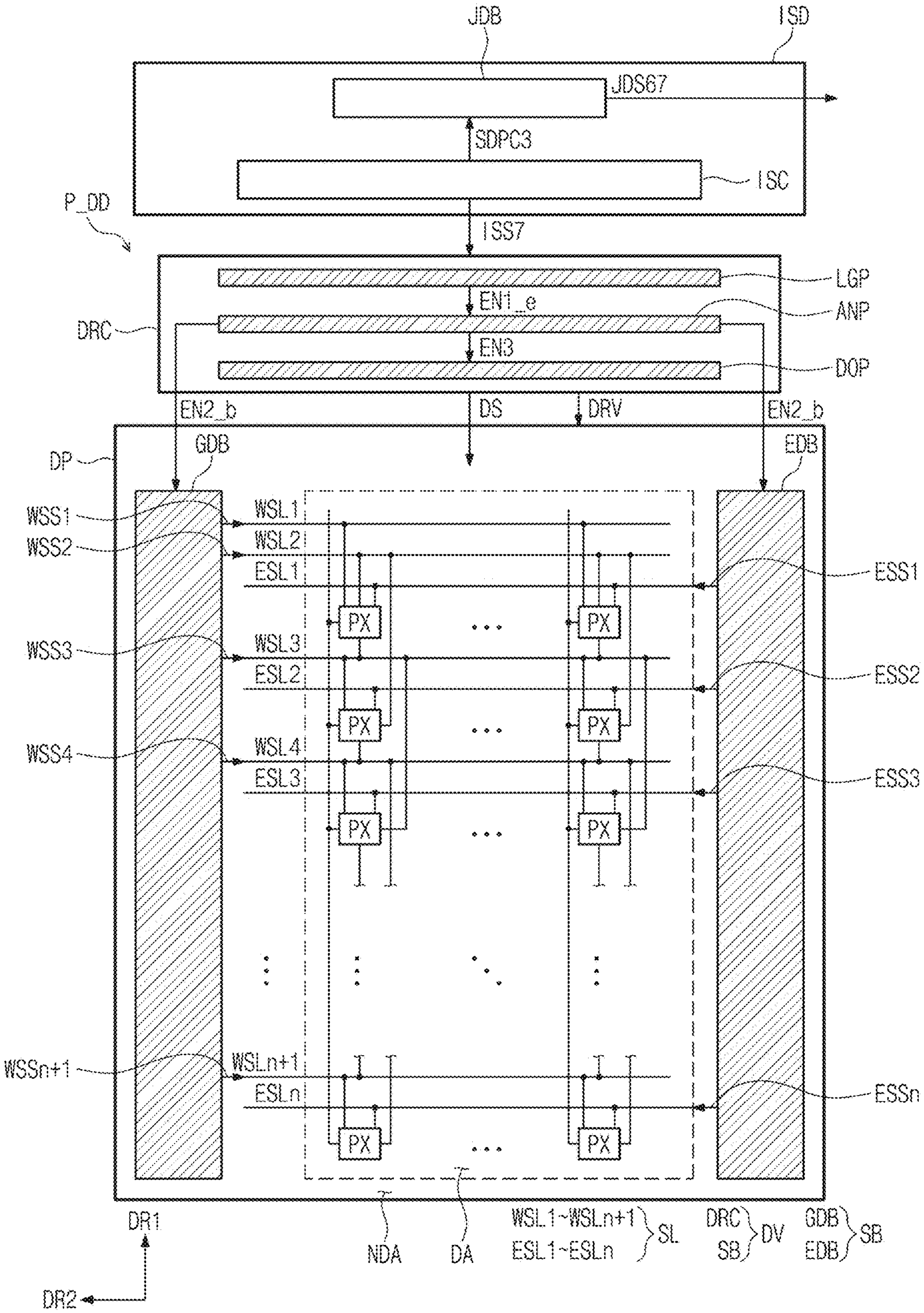

Referring to FIGS. 8B and 9G, operation S230 of determining the connection state between the pixels PX and the driving voltage lines is performed after operation S220 of determining the connection state between the pixels PX and the write scan lines WSL1 to WSLn+1. Operation S230 of determining the connection state between the pixels PX and the driving voltage lines includes operation S231 of measuring a current SDPC3 (hereinafter, referred to as a "third sub display current") provided to the preliminary display device P_DD while the driving voltage DRV is provided to the pixels PX and the display panel DP does not display the image IM (see FIG. 9H) and operation S232 of determining a connection state between the pixels PX and the driving voltage lines based on the third sub display current SDPC3.

In an embodiment of the disclosure, the inspection controller ISC may provide the driver chip DRC with a seventh inspection signal ISS7 for providing the driving voltage DRV to the pixels PX. In an embodiment of the disclosure, the sixth inspection signal ISS7 may include a voltage for enabling the logic part LGP, the analog part ANP, the scan block SB, and the data output part DOP and providing the emission scan signals ESS1 to ESSn, the write scan signals WSS1 to WSSn+1, and the driving voltage DRV to the pixels PX. In an embodiment of the disclosure, when receiving the seventh inspection signal ISS7, the logic part LGP generates a first output signal EN1_e for enabling the analog part ANP, and provides the first output signal EN1_e to the analog part ANP. When the analog part ANP receives the first output signal EN1_e, the analog part ANP generates the second output signal EN2_b for enabling the scan block SB, the third output signal EN3 for enabling the data output part DOP, and the driving voltage DRV. The analog part ANP provides the second output signal EN2_b to the scan block SB, provides the third output signal EN3 to the data output part DOP, and provides the driving voltage DRV to the pixels PX. When the scan block SB receives the second output signal EN2_b, the scan block SB provides the emission scan signals ESS1 to ESSn and the write scan signals WSL1 to WSLn+1 to the pixels PX. In embodiments of the disclosure, a defect may be prevented from occurring in the display device DD manufactured using the preliminary display device P_DD including the pixels PX, in which a connection defect to driving voltage lines may occur, by determining whether a connection between the pixels PX included in the preliminary display device P_DD and the driving voltage lines is defective.

Figure 9H:
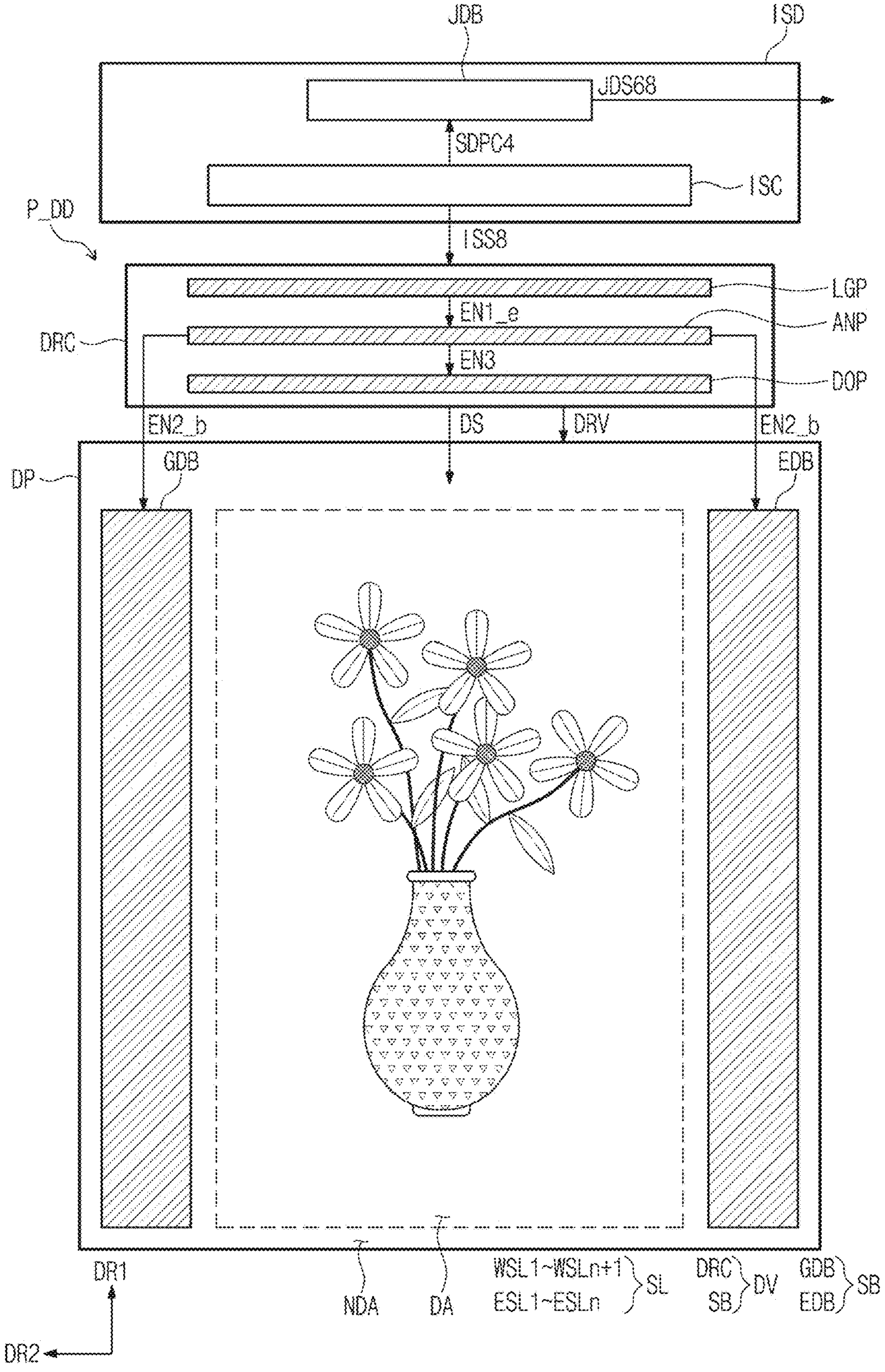

Referring to FIGS. 8B and 9H, operation S240 of determining whether the image IM displayed on the display panel DP is defective is performed after operation S230 of determining the connection state between the pixels PX and the driving voltage lines. Operation S240 of determining whether the image IM displayed on the display panel DP is defective includes operation S241 of measuring a current SPDC4 (hereinafter, referred to as a "fourth sub display current") provided to the preliminary display device P_DD when the image IM is displayed on the display panel DP, and operation S242 of determining whether the image IM displayed on the display panel DP is defective based on the fourth sub display current SPC4.

In an embodiment of the disclosure, the inspection controller ISC may provide the driver chip DRC with a seventh inspection signal ISS7 for providing the driving voltage DRV for displaying the image IM on the display panel DP. In an embodiment of the disclosure, when the seventh inspection signal ISS7 is provided to the driver chip DRC, the image IM may be displayed on the display panel DP. In an embodiment of the disclosure, the image IM may include a test pattern for determining whether the display panel DP is defective. In embodiments of the disclosure, a defect may be effectively prevented from occurring in the display device DD manufactured using the preliminary display device P_DD in which the display panel DP may have degraded display quality, by determining whether the image IM displayed on the display panel DP is defective.

Figure 10:
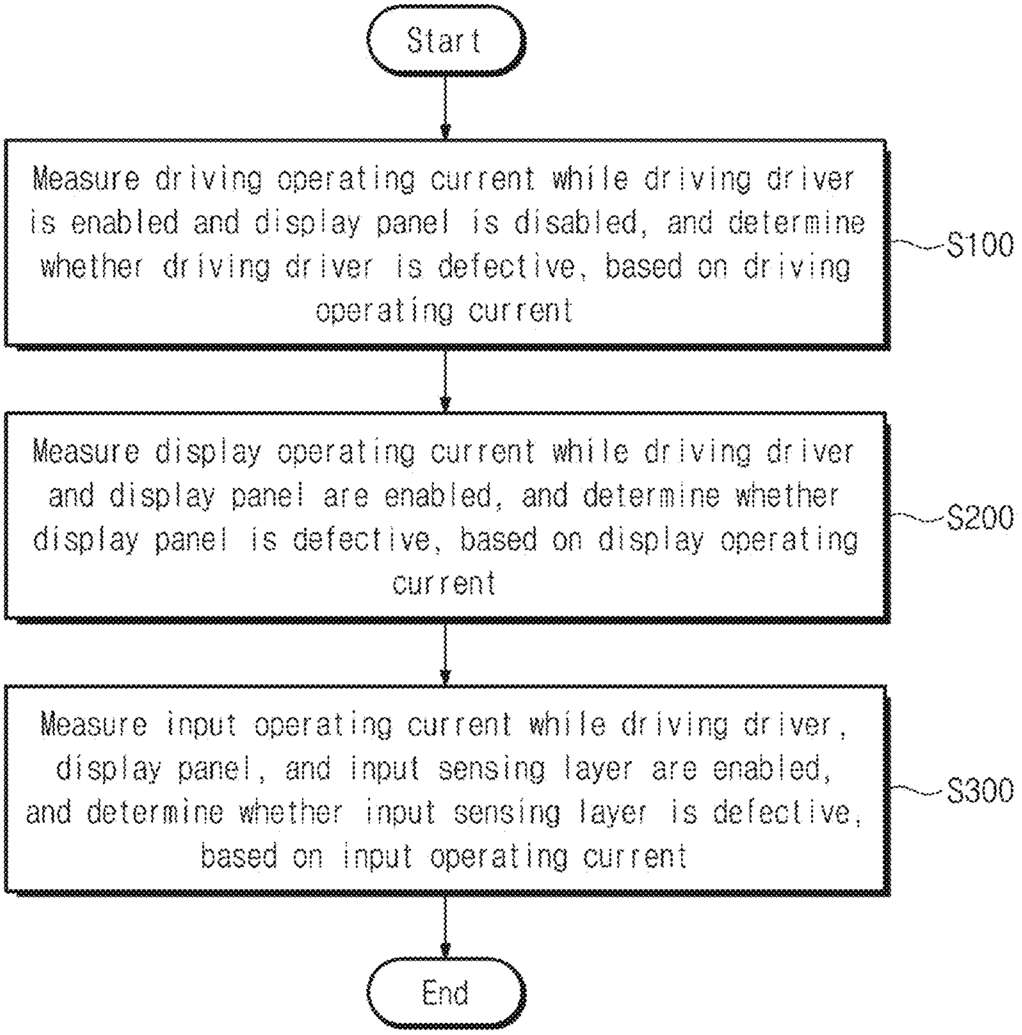
FIG. 10 is a flowchart illustrating a method of testing a display device, according to an embodiment of the disclosure.

FIG. 10 is a flowchart illustrating a method of testing a display device, according to an embodiment of the disclosure. Hereinafter, the same operations as operations described above with reference to FIG. 6 are marked by the same reference numerals, and thus, any repetitive detailed description will be omitted to avoid redundancy.

Referring to FIGS. 2, 4, and 10, an embodiment of a method of testing the display device DD (see FIG. 1) further includes operation S300 of determining whether the input sensing layer ISP is defective. In an embodiment of the disclosure, operation S300 of determining whether the input sensing layer ISP is defective may be performed after operation S200 of determining whether the display panel DP is defective. Operation S300 of determining whether the input sensing layer ISP is defective may be performed when the display panel DP is determined to be normal, in operation S200 of determining whether the display panel DP is defective.

In operation S300 of determining whether the input sensing layer ISP is defective, a current (hereinafter, referred to as an "input operating current") supplied to the preliminary display device P_DD is measured by using the inspection device ISD while the driver DV, the display panel DP, and the input sensing layer ISP are enabled. In operation S300 of determining whether the input sensing layer ISP is defective, whether the input sensing layer ISP is defective may be determined based on the input operating current measured by using the inspection device ISD. In embodiments of the disclosure, a defect may be prevented from occurring in the display device DD manufactured using the preliminary display device P_DD, by determining whether the input sensing layer ISP included in the preliminary display device P_DD is defective.

According to embodiments of the disclosure, it may be determined whether a display device is defective, by determining whether components included in the display device are defective. In In such embodiments, a method of testing a display device includes driving the display device on a step-by-step basis. According to embodiments of the disclosure, the method of testing a display device includes determining whether a configuration of the display device driven at a corresponding stage is defective, by measuring a current flowing through the display device at each step. In such embodiments, the quality and reliability of the display device may be improved by determining whether the display device is defective or whether there is a potential defect.

The invention should not be construed as being limited to the embodiments set forth herein. Rather, these embodiments are provided so that this disclosure will be thorough and complete and will fully convey the concept of the invention to those skilled in the art While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A method of testing a display device including a display panel which displays an image and a driver which drives the display panel, the method comprising:
- measuring a driving operating current in a state where the driver is enabled and the display panel is disabled, and determining whether the driver is defective, based on the driving operating current, wherein the driver comprises:
  - a logic part which receives an image signal and changes the image signal into an image data signal corresponding to the display panel; and
  - an analog part which changes the image data signal into a data signal for driving the display panel; and
- wherein determining whether the driver is defective comprises:
  - measuring a first sub driving current in a state where the logic part is enabled and the analog part is disabled; and
  - determining whether the logic part is defective, based on the first sub driving current.

2. The method of claim 1, further comprising measuring a display operating current in a state where the driver and the display panel are enabled, and determining whether the display panel is defective, based on the display operating current, wherein the determining whether the display panel is defective is performed when the driver is determined to be normal.

3. The method of claim 1, wherein the driver includes a driver chip which includes the logic part and the analog part, and a scan block which generates a scan signal for displaying the image, and
- wherein the determining whether the driver is defective includes:
- determining whether the driver chip is defective; and
- determining whether the scan block is defective.

4. The method of claim 3, wherein the determining whether the driver chip is defective further includes:
- measuring a second sub driving current in a state where the logic part and the analog part are enabled; and
- determining whether the analog part is defective, based on the second sub driving current.

5. The method of claim 4, wherein the determining whether the analog part is defective is performed after the determining whether the logic part is defective.

6. The method of claim 4, wherein the display panel includes a plurality of pixels which displays the image, and a plurality of data lines and a plurality of scan lines which are electrically connected to the pixels,
- wherein the scan block provides the scan signal to the display panel through the scan lines, and
- wherein the determining whether the scan block is defective includes:
- measuring a third sub driving current in a state where the scan block is enabled and the display panel is disabled; and
- determine whether the scan block is defective, based on the third sub driving current.

7. The method of claim 6, wherein the determining whether the scan block is defective is performed after the determining whether the analog part is defective.

8. The method of claim 6, wherein the driver chip further includes a data output part which provides the data signal to the display panel,
- wherein
- the determining whether the driver is defective further includes:
- determining whether the data output part is defective, and
- wherein the determining whether the data output part is defective includes:
- measuring a fourth sub driving current in a state where the data output part is enabled and the display panel is disabled; and
- determining whether the data output part is defective, based on the fourth sub driving current.

9. The method of claim 8, wherein the determining whether the data output part is defective is performed after the determining whether the scan block is defective.

10. The method of claim 2, wherein the display panel includes a plurality of pixels which displays the image, a plurality of write scan lines, a plurality of emission scan lines, and a plurality of driving voltage lines which are electrically connected to the pixels,
- wherein the driver includes a gate driving block which provides a write scan signal to the pixels through the write scan lines, and an emission driving block which provides an emission scan signal to the pixels through the emission scan lines, and
- wherein the determining whether the display panel is defective includes:
- measuring a first sub display current in a state where the emission scan signal is provided to the pixels and the write scan signal is not provided to the pixels; and
- determining a connection state between the pixels and the emission scan lines based on the first sub display current.

11. The method of claim 10, wherein the determining whether the display panel is defective is performed after the determining whether the driver is defective.

12. The method of claim 10, wherein the determining whether the display panel is defective further includes:

measuring a second sub display current in a state where the write scan signal is provided to the pixels and a driving voltage for driving the pixels is not provided to the pixels; and determining a connection state between the pixels and the write scan lines based on the second sub display current.

13. The method of claim 12, wherein the determining the connection state between the pixels and the write scan lines is performed after the determining the connection state between the pixels and the emission scan lines.

14. The method of claim 12, wherein the determining whether the display panel is defective further includes:

measuring a third sub display current in a state where the driving voltage is provided to the pixels and the display panel does not display the image; and determining a connection state between the pixels and the driving voltage lines based on the third sub display current.

15. The method of claim 14, wherein the determining the connection state between the pixels and the driving voltage lines is performed after the determining the connection state between the pixels and the write scan lines.

16. The method of claim 14, wherein the determining whether the display panel is defective further includes:

measuring a fourth sub display current in a state the image is displayed on the display panel; and determining whether the image is detective, based on the fourth sub display current.

17. The method of claim 16, wherein the determining whether the image is defective is performed after the determining the connection state between the pixels and the driving voltage lines.

18. The method of claim 16, wherein the display device further includes an input sensing layer disposed on the display panel, wherein the input sensing layer detects an external input, the method further comprises:

measuring an input operating current in a state the driver, the display panel and the input sensing layer are enabled; and determining whether the input sensing layer is defective, based on the input operating current.

19. The method of claim 18, wherein, the determining whether the input sensing layer is defective is performed when the display panel is determined to be normal.

20. A method of testing a display device including a display panel which includes a plurality of pixels which displays an image, a plurality of write scan lines, a plurality of emission scan lines, and a plurality of driving voltage lines which are electrically connected to the pixels, and a driver which drives the display panel, the method comprising:

measuring a display operating current in a state where the driver and the display panel are enabled, and determining whether the display panel is defective, based on the display operating current, wherein determining whether the display panel is defective includes:

measuring a first sub display current in a state where an emission scan signal is provided from the driver to one or more pixels of the display panel and a write scan signal is not provided by the driver to the one or more pixels;

determining a connection state between the one or more pixels and the emission scan lines based on the first sub display current; and responsive to determining the connection state between the one or more pixels and the emission scan lines:

measuring a second sub display current in a state where the write scan signal is provided to the one or more pixels and a driving voltage is not provided to the one or more pixels; and determining a connection state between the one or more pixels and the write scan lines based on the second sub display current.

* * * * *